United States Patent
Fu et al.

(10) Patent No.: US 11,102,484 B2
(45) Date of Patent: Aug. 24, 2021

(54) BLOCK PARTITIONING IN VIDEO CODING

(71) Applicant: Huawei Technologies Co., Ltd., Shenzhen (CN)

(72) Inventors: Jiali Fu, Shenzhen (CN); Yin Zhao, Shenzhen (CN); Shan Gao, Shenzhen (CN); Huanbang Chen, Shenzhen (CN); Haitao Yang, Shenzhen (CN); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/929,979

(22) Filed: Jul. 15, 2020

(65) Prior Publication Data

US 2020/0351500 A1 Nov. 5, 2020

Related U.S. Application Data

(63) Continuation of application No. PCT/US2019/027500, filed on Apr. 15, 2019.
(Continued)

(51) Int. Cl.
*H04N 19/122* (2014.01)
*H04N 19/119* (2014.01)
(Continued)

(52) U.S. Cl.
CPC ......... *H04N 19/122* (2014.11); *H04N 19/119* (2014.11); *H04N 19/159* (2014.11); *H04N 19/61* (2014.11)

(58) Field of Classification Search
CPC .. H04N 19/122; H04N 19/119; H04N 19/159; H04N 19/61; H04N 19/149; H04N 19/103
See application file for complete search history.

(56) References Cited

U.S. PATENT DOCUMENTS 9,661,347 B2 * 5/2017 Lee .................. H04N 19/96
9,788,019 B2 10/2017 Liu et al.
(Continued)

FOREIGN PATENT DOCUMENTS

KR 20170122351 A 11/2017
WO 2017157249 A1 9/2017

OTHER PUBLICATIONS

Iwamura, S., et al., "Direction-dependent sub-TU scan order on intra prediction," Joint Video Exploration Team (JVET) of ITU-T SG 16 WP 3 and ISO/IEC JTC 1/SC 29/WG 11, 2nd Meeting: San Diego, USA, Feb. 20-26, 2016, JVET-B0028, 4 pages.

*Primary Examiner* — Tat C Chio
(74) *Attorney, Agent, or Firm* — Conley Rose, P.C.

(57) ABSTRACT

A video coding mechanism is disclosed. The mechanism includes selecting a split mechanism to split a coding unit (CU) into sub-CUs for application of one or more transform units (TUs), the selection of the split mechanism based on comparing a CU width to a max TU width and comparing a CU height to a max TU height. The selected split mechanism is applied to the CU to obtain sub-CUs. A residual of one of the sub-CUs is determined. The residual includes a difference between sample values for the sub-CU and prediction samples for the sub-CU. The TUs are applied to transform the residual of the CU based on results of the selected split mechanism. A transformed residual for the CU is encoded into a bitstream.

14 Claims, 16 Drawing Sheets

Related U.S. Application Data

(60) Provisional application No. 62/659,583, filed on Apr. 18, 2018, provisional application No. 62/659,673, filed on Apr. 18, 2018, provisional application No. 62/659,135, filed on Apr. 18, 2018.

(51) Int. Cl.
*H04N 19/159* (2014.01)
*H04N 19/61* (2014.01)

(56) References Cited

U.S. PATENT DOCUMENTS

2018/0070105 A1* 3/2018 Jin ..................... H04N 19/172
2019/0075328 A1* 3/2019 Huang ................ H04N 19/96

* cited by examiner

BLOCK PARTITIONING IN VIDEO CODING

CROSS-REFERENCE TO RELATED APPLICATIONS

This patent application is a continuation of International Application No. PCT/US2019/027500, filed Apr. 15, 2019 by Jiali Fu, et. al., and titled "Block Partitioning In Video Coding," which claims the benefit of U.S. Provisional Patent Application No. 62/659,583, filed Apr. 18, 2018 by Jiali Fu, et. al., and titled "Split Mode Restriction In Block Partitioning For Video Coding," U.S. Provisional Patent Application No. 62/659,673, filed Apr. 18, 2018 by Jiali Fu, et. al., and titled "Split Mode Restriction In Block Partitioning For Video Coding," and U.S. Provisional Patent Application No. 62/659,135, filed Apr. 18, 2018 by Jiali Fu, et. al., and titled "Split Mode Restriction In Block Partitioning For Video Coding," which are hereby incorporated by reference.

TECHNICAL FIELD

The present disclosure is generally related to video coding, and is specifically related to sub-dividing coding units (CUs) for application of transform units (TUs) as part of a video coding mechanism.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in an encoder. The method comprises selecting, by the processor, a split mechanism to split a CU into sub-CUs for application of one or more TUs, the split mechanism selected by comparing a CU width to a max TU width and comparing a CU height to a max TU height. The method further comprises applying, by the processor, the selected split mechanism to the CU. The method further comprises determining, by the processor, a residual of the CU, the residual including a difference between sample values for the CU and prediction samples for the CU. The method further comprises applying the TUs to transform the residual of the CU based on results of the selected split mechanism. The method further comprises encoding, by the processor, a transformed residual for the CU into a bitstream. The method further comprises transmitting, by a transmitter coupled to the processor, the bitstream toward a decoder to support reconstructing the CU for display. In some video coding systems, a single TU is placed onto a CU to transform some portion of residual the residual samples resulting from intra-prediction and/or inter-prediction. In some cases, the max TU size is smaller than the size of the CU, which potentially leaves some portion of the residual samples untransformed. The present embodiment includes a mechanism for splitting a CU into sub-CUs by comparing CU size and max TU size. This allows multiple TUs to be applied to a CU based on the sub-CU split in order to maximize the number of residual samples that are transformed. This in turn increases coding efficiency.

Optionally, in any of the preceding aspects, another implementation of the aspect provides, wherein the split mechanism includes: determining that a first CU side size is greater than a first max TU side size, and that a second CU side size is less than or equal to a second max TU side size, and based on the determination that the first CU side size is greater than the first max TU side size and the second CU side size is less than or equal to the second max TU side size, determine not to split the CU.

Optionally, in any of the preceding aspects, another implementation of the aspect provides, wherein the split mechanism includes: determining that a first CU side size is greater than a first max TU side size, and that a second CU side size is less than or equal to a second max TU side size, and based on the determination that the first CU side size is greater than the first max TU side size and the second CU side size is less than or equal to the second max TU side size, split the CU by creating a sub-CU split perpendicular to the first CU side size.

Optionally, in any of the preceding aspects, another implementation of the aspect provides, wherein the split mechanism includes: determining that a first CU side size is greater than, and not an integer multiple of, a first max TU side size, and that a second CU side size is greater than, and not an integer multiple of, a second max TU side size, and based on the determination that the first CU side size is greater than, and not an integer multiple of, the first max TU side size, and that the second CU side size is greater than, and not an integer multiple of, the second max TU side size, split the CU by creating sub-CU splits perpendicular to the first CU side size until the first CU side size is smaller than the first max TU side or by creating sub-CU splits perpendicular to the second CU side size until the second CU side size is smaller than the second max TU side.

Optionally, in any of the preceding aspects, another implementation of the aspect provides, wherein the split mechanism includes: determining that a first CU side size is greater than, and not an integer multiple of, a first max TU side size, and that a second CU side size is greater than, and not an integer multiple of, a second max TU side size, and based on the determination that the first CU side size is greater than, and not an integer multiple of, the first max TU side size, and that the second CU side size is greater than, and not an integer multiple of, the second max TU side size, split the CU by creating sub-CU splits perpendicular to the first CU side size until the first CU side size is smaller than the first max TU side and by creating sub-CU splits perpendicular to the second CU side size until the second CU side size is smaller than the second max TU side.

Optionally, in any of the preceding aspects, another implementation of the aspect provides, wherein sub-CU splits made perpendicular to the first CU side do not further split sub-CU splits made perpendicular to the second CU side and vice versa.

Optionally, in any of the preceding aspects, another implementation of the aspect provides, further comprising encoding a flag in the bitstream to indicate the split mechanism selected for the CU.

Optionally, in any of the preceding aspects, another implementation of the aspect provides, further comprising selecting an intra-prediction mode to encode the CU, wherein applying the TUs to transform the residual of the CU based on results of the selected split mechanism includes applying the TUs in an order based on the intra-prediction mode.

Optionally, in any of the preceding aspects, another implementation of the aspect provides, wherein the intra-prediction mode points in a direction, and wherein applying the TUs in an order based on the intra-prediction mode includes: first applying a first TU positioned opposite of the direction pointed to by the intra-prediction mode, and applying a last TU positioned in the direction pointed to by the intra-prediction mode last.

In an embodiment, the disclosure includes a video coding device comprising a processor and a transmitter coupled to the processor, the processor and transmitter configured to perform the method of any of the abovementioned aspects.

In an embodiment, the disclosure includes non-transitory computer readable medium comprising a computer program product for use by a video coding device, the computer program product comprising computer executable instructions stored on the non-transitory computer readable medium such that when executed by a processor cause the video coding device to perform the method of any of the abovementioned aspects.

In an embodiment, the disclosure includes an encoder comprising a split mechanism means for selecting a split mechanism to split a CU into sub-CUs for application of one or more TUs, the split mechanism selected by comparing a CU width to a max TU width and comparing a CU height to a max TU height. The encoder further comprises a split application means for applying the selected split mechanism to the CU. The encoder further comprises a residual means for determining a residual of the CU, the residual including a difference between sample values for the CU and prediction samples for the CU. The encoder further comprises a transform means for applying the TUs to transform the residual of the CU based on results of the selected split mechanism. The encoder further comprises an encoding means for encoding a transformed residual for the CU into a bitstream. The encoder further comprises a transmitting means for transmitting the bitstream toward a decoder to support reconstructing the CU for display. In some video coding systems, a single TU is placed onto a CU to transform some portion of residual the residual samples resulting from intra-prediction and/or inter-prediction. In some cases, the max TU size is smaller than the size of the CU, which potentially leaves some portion of the residual samples untransformed. The present embodiment includes a mechanism for splitting a CU into sub-CUs by comparing CU size and max TU size. This allows multiple TUs to be applied to a CU based on the sub-CU split in order to maximize the number of residual samples that are transformed. This in turn increases coding efficiency.

Optionally, in any of the preceding aspects, another implementation of the aspect provides, wherein the encoder is further configured to perform the method of any of the abovementioned aspects.

In an embodiment, the disclosure includes a method implemented in a decoder, the method comprising receiving, by a receiver, a bitstream, the bitstream including a transformed residual of a CU, the transformed residual including a difference between sample values for the CU and prediction samples for the CU as being transformed by a transform. The method further comprises selecting, by the processor, a split mechanism to split the CU into sub-CUs for application of one or more inverse TUs to the transformed residual, the split mechanism selected by comparing a CU width to a max TU width and comparing a CU height to a max TU height. The method further comprises applying, by the processor, the selected split mechanism to the CU and applying the inverse TUs to decompress the transformed residual into a residual of the CU based on results of the selected split mechanism. The method further comprises reconstructing, by the processor, sample values for the CU based on the residual and the prediction samples. The method further comprises forwarding, by the processor, the reconstructed sample values for the CU toward a display a part of a reconstructed video. In some video coding systems, a single TU is placed onto a CU to transform some portion of residual the residual samples resulting from intra-prediction and/or inter-prediction. In some cases, the max TU size is smaller than the size of the CU, which potentially leaves some portion of the residual samples untransformed. The present embodiment includes a mechanism for splitting a CU into sub-CUs by comparing CU size and max TU size. This allows multiple TUs to be applied to a CU based on the sub-CU split in order to maximize the number of residual samples that are transformed. This in turn increases coding efficiency.

Optionally, in any of the preceding aspects, another implementation of the aspect provides, wherein the split mechanism includes: determining that a first CU side size is greater than a first max TU side size, and that a second CU side size is less than or equal to a second max TU side size, and based on the determination that the first CU side size is greater than the first max TU side size and the second CU side size is less than or equal to the second max TU side size, determine not to split the CU.

Optionally, in any of the preceding aspects, another implementation of the aspect provides, wherein the split mechanism includes: determining that a first CU side size is greater than a first max TU side size, and that a second CU side size is less than or equal to a second max TU side size, and based on the determination that the first CU side size is greater than the first max TU side size and the second CU side size is less than or equal to the second max TU side size, split the CU by creating a sub-CU split perpendicular to the first CU side size.

Optionally, in any of the preceding aspects, another implementation of the aspect provides, wherein the split mechanism includes: determining that a first CU side size is greater than, and not an integer multiple of, a first max TU side size, and that a second CU side size is greater than, and not an integer multiple of, a second max TU side size, and based on the determination that the first CU side size is greater than, and not an integer multiple of, the first max TU side size, and that the second CU side size is greater than, and not an integer multiple of, the second max TU side size, split the CU by creating sub-CU splits perpendicular to the first CU side size until the first CU side size is smaller than the first max TU side or by creating sub-CU splits perpendicular to the second CU side size until the second CU side size is smaller than the second max TU side.

Optionally, in any of the preceding aspects, another implementation of the aspect provides, wherein the split mechanism includes: determining that a first CU side size is greater than, and not an integer multiple of, a first max TU side size, and that a second CU side size is greater than, and not an integer multiple of, a second max TU side size, and based on the determination that the first CU side size is greater than, and not an integer multiple of, the first max TU side size, and that the second CU side size is greater than, and not an integer multiple of, the second max TU side size, split the CU by creating sub-CU splits perpendicular to the first CU side size until the first CU side size is smaller than the first max TU side and by creating sub-CU splits perpendicular to the second CU side size until the second CU side size is smaller than the second max TU side.

Optionally, in any of the preceding aspects, another implementation of the aspect provides, wherein sub-CU splits made perpendicular to the first CU side do not further split sub-CU splits made perpendicular to the second CU side and vice versa.

Optionally, in any of the preceding aspects, another implementation of the aspect provides, further comprising receiving, by the receiver, a flag in the bitstream indicating the split mechanism selected for the CU.

Optionally, in any of the preceding aspects, another implementation of the aspect provides, wherein the bistream includes an intra-prediction mode for the CU, and wherein applying the inverse TUs to decompress the transformed residual into a residual of the CU based on results of the selected split mechanism includes applying the inverse TUs in an order based on the intra-prediction mode.

Optionally, in any of the preceding aspects, another implementation of the aspect provides, wherein the intra-prediction mode points in a direction, and wherein applying the inverse TUs in an order based on the intra-prediction mode includes: first applying a first inverse TU positioned opposite of the direction pointed to by the intra-prediction mode, and applying a last inverse TU positioned in the direction pointed to by the intra-prediction mode last.

In an embodiment, the disclosure includes a video coding device comprising a processor and a receiver coupled to the processor, the processor and the receiver configured to perform the method of any of the abovementioned aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the abovementioned aspects.

In an embodiment, the disclosure includes a decoder comprising a receiving means for receiving a bitstream, the bitstream including a transformed residual of a CU, the transformed residual including a difference between sample values for the CU and prediction samples for the CU as being transformed by a transform; The decoder further comprises a split mechanism means for selecting a split mechanism to split the CU into sub-CUs for application of one or more inverse TUs to the transformed residual, the split mechanism selected by comparing a CU width to a max TU width and comparing a CU height to a max TU height. The decoder further comprises a transform means for applying the selected split mechanism to the CU and applying the inverse TUs to decompress the transformed residual into a residual of the CU based on results of the selected split mechanism. The decoder further comprises a decoding means for reconstructing sample values for the CU based on the residual and the prediction samples. The decoder further comprises a display interface means for forwarding the reconstructed sample values for the CU toward a display as part of a reconstructed video. In some video coding systems, a single TU is placed onto a CU to transform some portion of residual the residual samples resulting from intra-prediction and/or inter-prediction. In some cases, the max TU size is smaller than the size of the CU, which potentially leaves some portion of the residual samples untransformed. The present embodiment includes a mechanism for splitting a CU into sub-CUs by comparing CU size and max TU size. This allows multiple TUs to be applied to a CU based on the sub-CU split in order to maximize the number of residual samples that are transformed. This in turn increases coding efficiency.

Optionally, in any of the preceding aspects, another implementation of the aspect provides, wherein the decoder is further configured to perform the method of any of the abovementioned aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
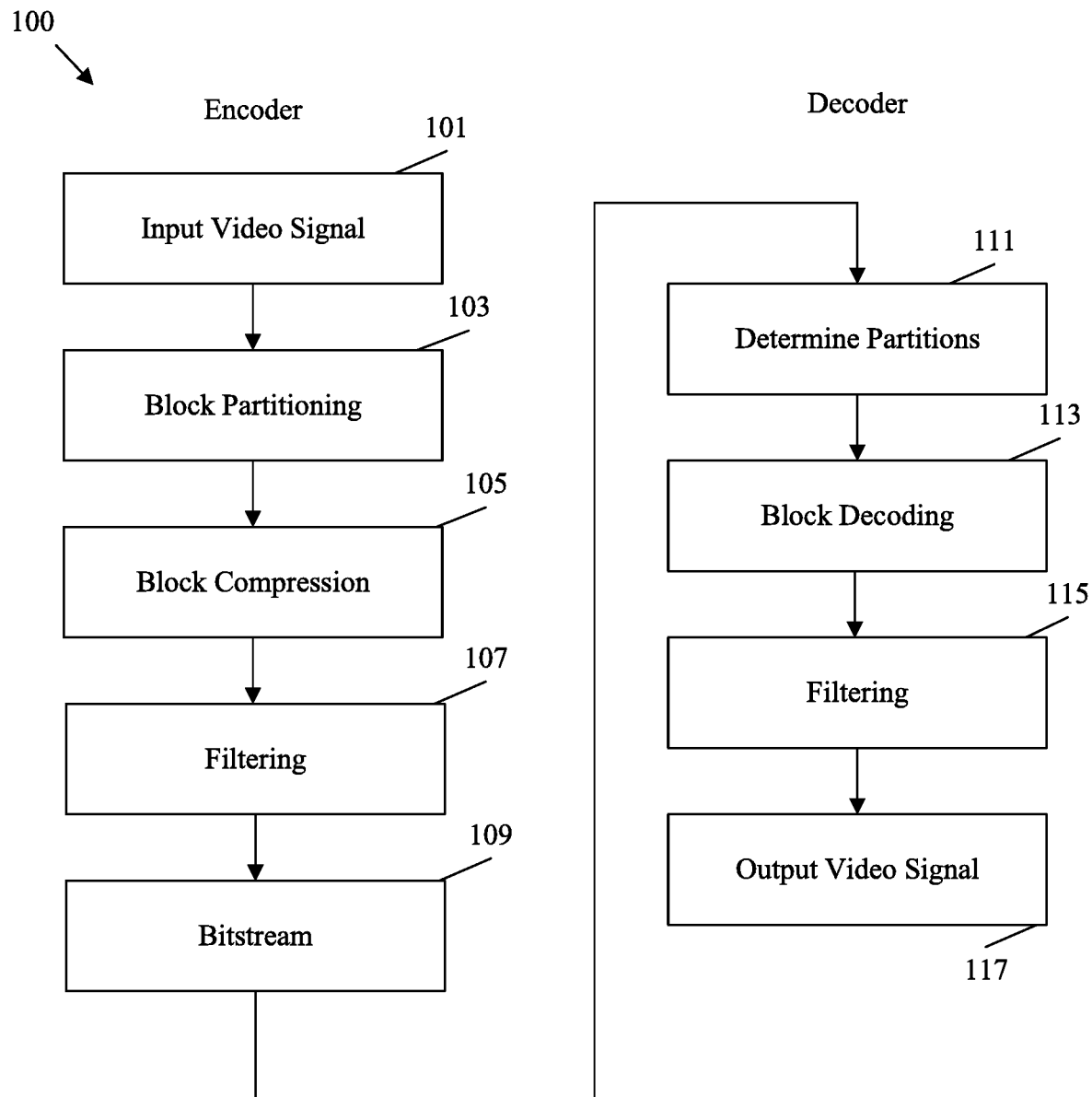
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding includes partitioning video frames into blocks and encoding the blocks via intra-prediction and inter-prediction to compress the size of a video file. Specifically, the video frames can be partitioned into coding units (CUs) that contain luma coding blocks (CBs) and chroma CBs (light values and color values, respectively). Prediction (intra or inter) can then be applied to determine reference blocks for the coding blocks. Prediction results in prediction information that codes the CBs by reference to the reference block(s). Samples (e.g., pixels) of the CBs are compared to samples of the reference block(s) and differences in values are maintained as residual samples. The residual samples result in residual blocks in the CU. To further compress the CU, transforms can be applied to the residual samples by employing transform units (TUs). A TU containing a transform core can be overlaid onto a CU's residual block to convert the residual samples into transform coefficients. A TU containing an inverse transform can be employed at a decoder to recover the residual samples in order to reconstruct the CBs for the CU.

The present disclosure relates to improvements in the process of applying a TU to a CU. CUs are created by partitioning a coding tree unit (CTU). CUs can vary in size based on the partitioning process. TUs can also vary in size to fit the CUs. However, TUs have a max size. Accordingly, in some cases a CU can be larger than the max TU size. In such cases, placing a single TU onto the CU can leave some residual samples outside of the TU. This results in some untransformed, and hence uncompressed, residual samples.

Disclosed herein are mechanisms to improve application of TUs to CUs to better cover residual samples, and hence increase compression and coding efficiency. Specifically, the disclosed mechanisms split a CU into sub-CUs and apply a TU to each sub-CU. The split mechanism is selected by comparing CU width and height to max TU width and height, respectively. When a first CU side size is greater than a first max TU side size (e.g., height or width) and a second CU side size is less than or equal to a second max TU side size (e.g., width or height), then the CU can be split by applying a sub-CU split perpendicular to the first CU side size. A sub-CU split is a partition applied to a CU to sub-divide the CU into sub-CUs. Alternatively, the mechanism can determine to not split the CU further. In other cases, the mechanism can determine that a first CU side size is greater than, and not an integer multiple of, a first max TU side size, and that a second CU side size is greater than, and not an integer multiple of, a second max TU side size. In this case, the CU can be split by creating sub-CU splits perpendicular to the first CU side size until the first CU side size is smaller than the first max TU side or by creating sub-CU splits perpendicular to the second CU side size until the second CU side size is smaller than the second max TU side. Alternatively, the CU can be split by creating sub-CU splits perpendicular to the first CU side size until the first CU side size is smaller than the first max TU side and by creating sub-CU splits perpendicular to the second CU side size until the second CU side size is smaller than the second max TU side. Flags can be employed to signal which split mechanism is employed. Applying such mechanisms may result in tiling TUs onto a CU in order to cover the CU, and hence fully covering the residual in most cases. In a further example, the TUs can be applied in an order selected based on the prediction information. Specifically, the present disclosure may be related to CUs designated for intra-prediction. Such CUs are coded based on predication modes that point to reference blocks in the same frame. The TUs can be applied adaptively based on prediction angle. Specifically, the TUs can be applied in an order beginning with a position opposite of the direction pointed to by the intra-prediction mode (e.g., farthest away from the reference block) and ending with a position in the same direction pointed to by the intra-prediction mode (e.g., closest to the reference block). This approach may support increased parallelism by making residual samples available for reconstruction, which can then be employed as reference samples for other samples in the same block in the direction of the prediction angle.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal, but it should be noted there exist some differences between the decoding process and the encoding process for correctly reconstructing the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component, which are somehow interleaved in one transmitting channel and de-interleaved at the receiving end. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks/triangular blocks for compression. For example, in High Efficiency Video Coding (HEVC) (also known as H.265 and MPEG-H Part 2) the frame can first be divided into coding tree units (CTUs), which are blocks of a predefined size (e.g., sixty four pixels by sixty four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

The present disclosure relates to modifications to provide for increased coding efficiency (e.g., file size reduction), increased accuracy, and/or reduced coding complexity (e.g., reduced processor resource usage) when compressing blocks. Hence, the present disclosure improves the functionality of block compression at step 105 at the encoder and block decoding at step 113 at the decoder. Specifically, at steps 105 and 113, a CU containing coding blocks is divided into sub-CUs. TUs containing transforms can then be tiled onto the CU based on sub-CU boundaries to completely cover residual samples in residual block(s) when the CU is larger than the max TU size.

Figure 2:
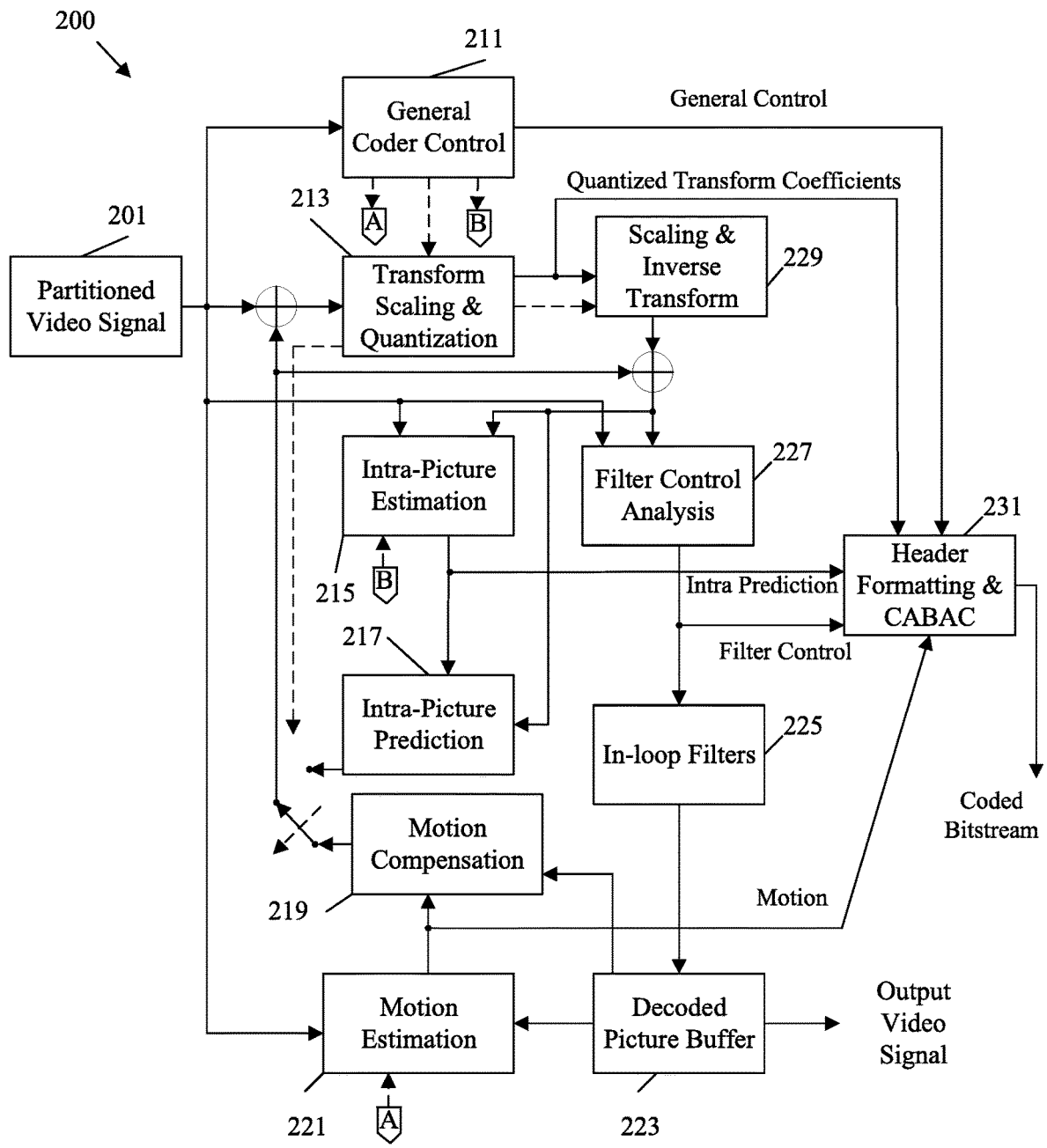
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or one or more transform unit (TUs) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as code word mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

The present disclosure relates to modifications to provide for increased coding efficiency (e.g., file size reduction), increased accuracy, and/or reduced coding complexity (e.g., reduced processor resource usage) when compressing blocks. For example, the present disclosure improves the functionality of transform scaling and quantization component 213 and/or scaling and inverse transform component 229. Specifically, the transform scaling and quantization component 213 may split CUs containing coding blocks into sub-CUs for application of transforms. TUs containing transforms can then be tiled onto the CU based on sub-CU boundaries to completely cover residual samples in residual block(s) when the CU is larger than the max TU size. The scaling and inverse transform component 229 may reverse such a process to create reference blocks and/or to create reconstructed blocks for display. The present disclosure may also improve the functionality of intra-picture estimation component 215 and/or intra-picture prediction component 217 by altering TU application order to create additional reference samples for intra-prediction.

Figure 3:
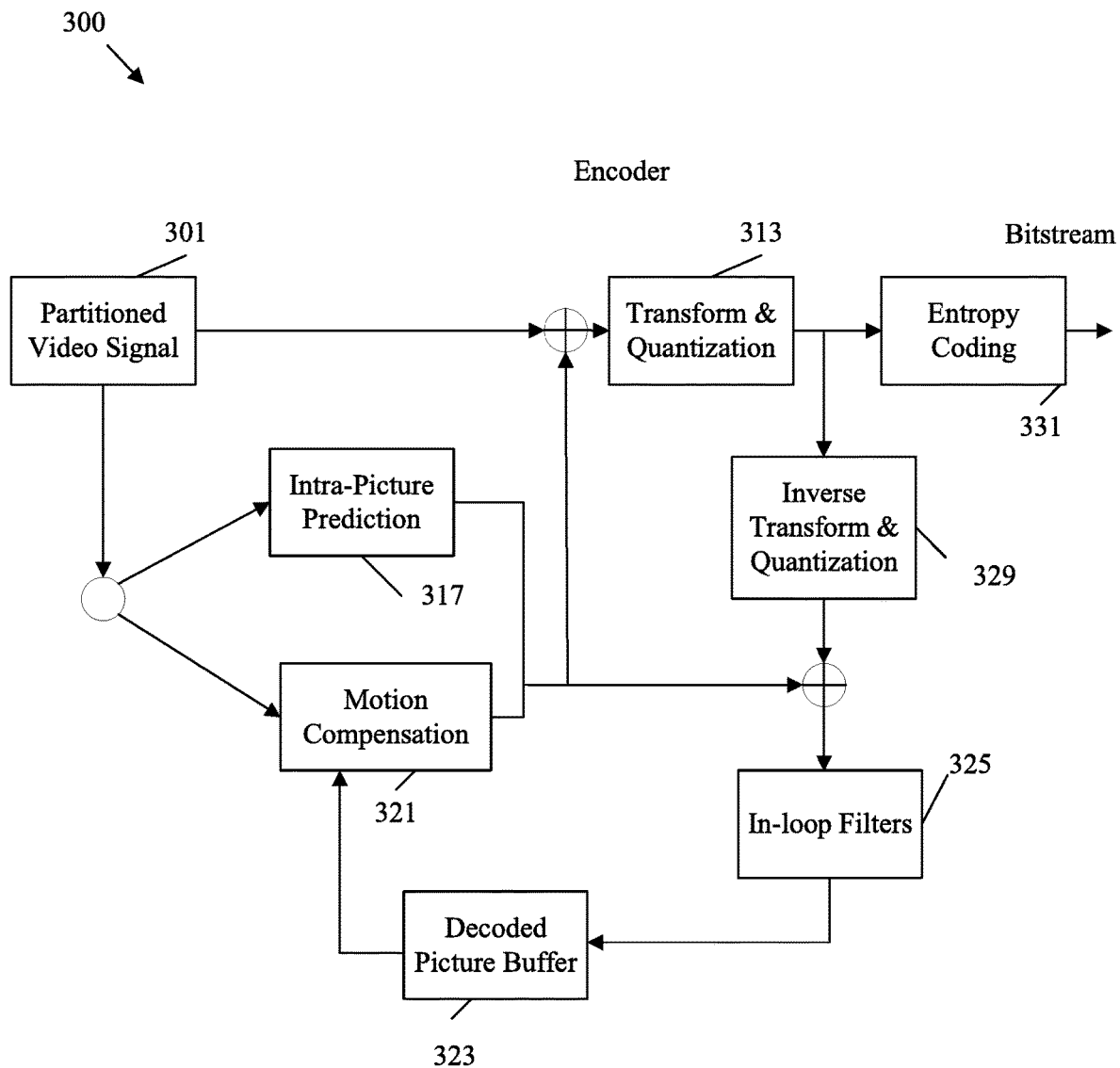
FIG. 3 is a schematic diagram illustrating an example video encoder that may divide CUs into sub-CUs.

FIG. 3 is a block diagram illustrating an example video encoder 300 that may divide CUs into sub-CUs. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transformation and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

For example, a prediction mode for a CU can be selected by intra-picture prediction component 317. The intra-picture prediction component 317 can then split the CU into sub-CUs and determine residual samples for the CU based on the selected prediction mode by determining a difference between samples in the CU and reference samples indicated by the prediction mode based on sub-CU boundaries. The intra-picture prediction component 317 can then forward the residual samples to the transform and quantization component 313, which can apply TUs based on the sub-CU boundaries to compress the residual samples. In other examples, the intra-picture prediction component 317 can select an intra-prediction mode for a CU and determine the residual samples. The intra-picture prediction component 317 can then forward the residual samples to the transform and quantization component 313, which can split the CU into sub-CUs and apply the TUs based on the sub-CU splits.

Regardless of the particular implementation, the disclosed mechanism splits the CU into sub-CUs for application of TUs to compress the residual samples. The split mechanism is selected by comparing CU width and height to max TU width and height, respectively. Various spit mechanisms are discussed below. Splitting the CU into sub-CUs for application of multiple TUs allows for increased TU coverage, and hence supports ensuring that substantially all of the residual samples are transformed (e.g., and hence not encoded at untransformed residual values). Further, in some examples the TUs and/or inverse TUs can be applied to the sub-CUs based on the intra-prediction mode selected for the CU (e.g., at the transform and quantization component 313 and/or at the inverse transform and quantization component 329). This allows the samples in one sub-CU to act as reference samples for samples in another sub-CU of the same CU. Accordingly, this approach supports increased parallel processing capabilities, increased coding accuracy, and/or increased coding efficiency. Accordingly, the disclosed mechanisms may improve the functionality of the intra-picture prediction component 317, the transform and quantization component 313, and/or the inverse transform and quantization component 329.

Figure 4:
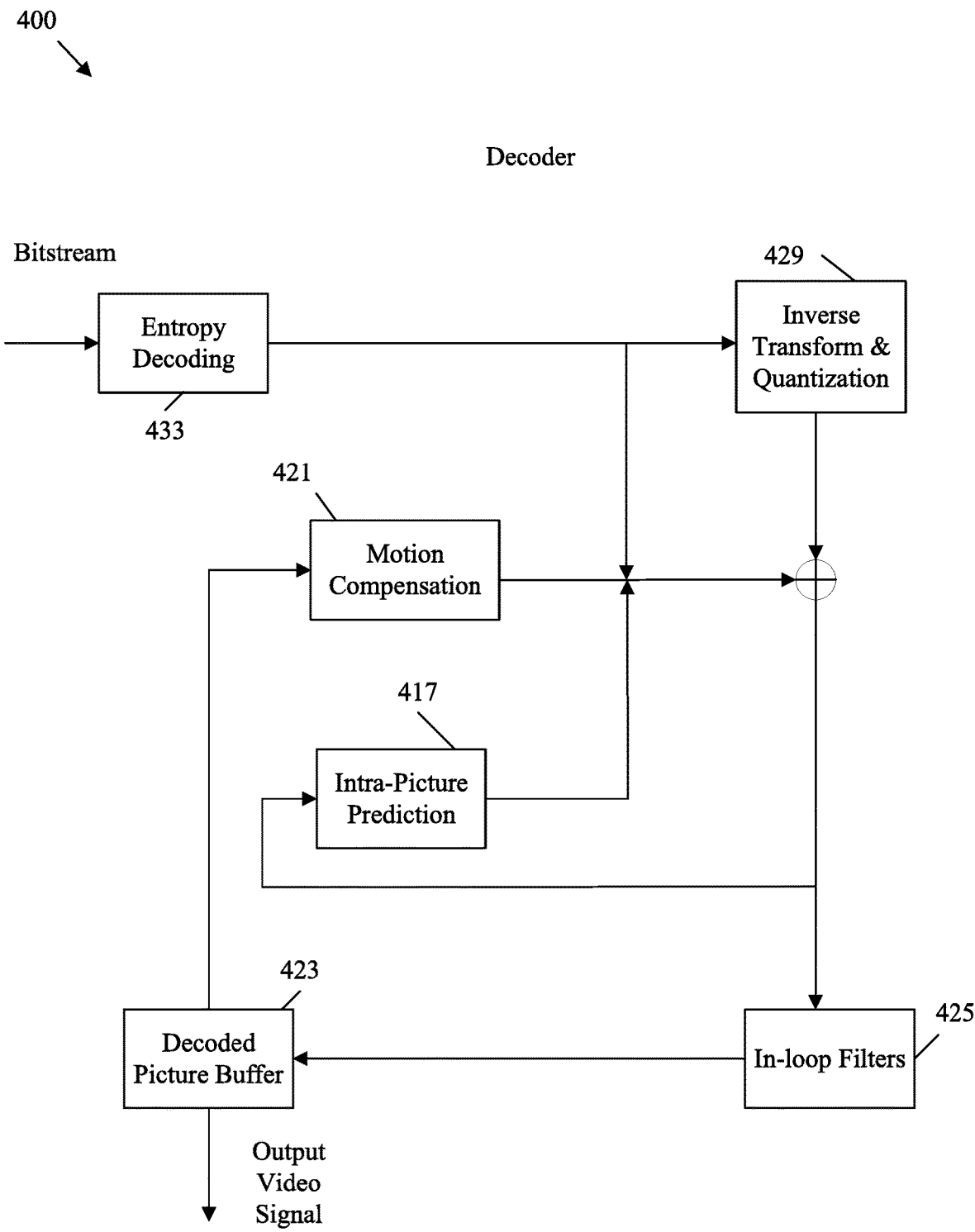
FIG. 4 is a schematic diagram illustrating an example video decoder that may divide CUs into sub-CUs.

FIG. 4 is a block diagram illustrating an example video decoder 400 that may divide CUs into sub-CUs. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as code words in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks, and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Like the video encoder 300, the video decoder 400 can split CUs into sub-CUs. The split can be applied by the intra-picture prediction component 417 and/or the inverse transform and quantization component 429, depending on the example. The disclosed mechanism splits the CU into sub-CUs for application of inverse TUs to decompress the residual samples. The split mechanism is selected by comparing CU width and height to max TU width and height, respectively. For example, the intra-picture prediction component 417 can employ the intra-prediction mode coded into the bitstream to determine the prediction values for the samples in the CU based on reference samples. Further, the inverse transform and quantization component 429 can apply the inverse TUs based on the sub-CU splits to reconstruct the residual samples for the CU. The residual samples and the prediction values can then be combined to reconstruct the samples for the CU for inclusion in the video. Splitting the CU into sub-CUs for application of multiple inverse TUs allows for increased TU coverage, and hence supports ensuring that substantially all of the residual samples are transformed when received in the bitstream (e.g., and hence not received as untransformed residual values). Further, in some examples the inverse TUs can be applied to the sub-CUs at the inverse transform and quantization component 429 in an order based on the intra-prediction mode for the CU. This allows the samples in one sub-CU to act as reference samples for samples in another sub-CU of the same CU. Accordingly, this approach supports increased parallel processing capabilities, increased coding accuracy, and/or increased coding efficiency. Accordingly, the disclosed mechanisms may improve the functionality of the intra-picture prediction component 417 and/ inverse transform and quantization component 429.

Figure 5:
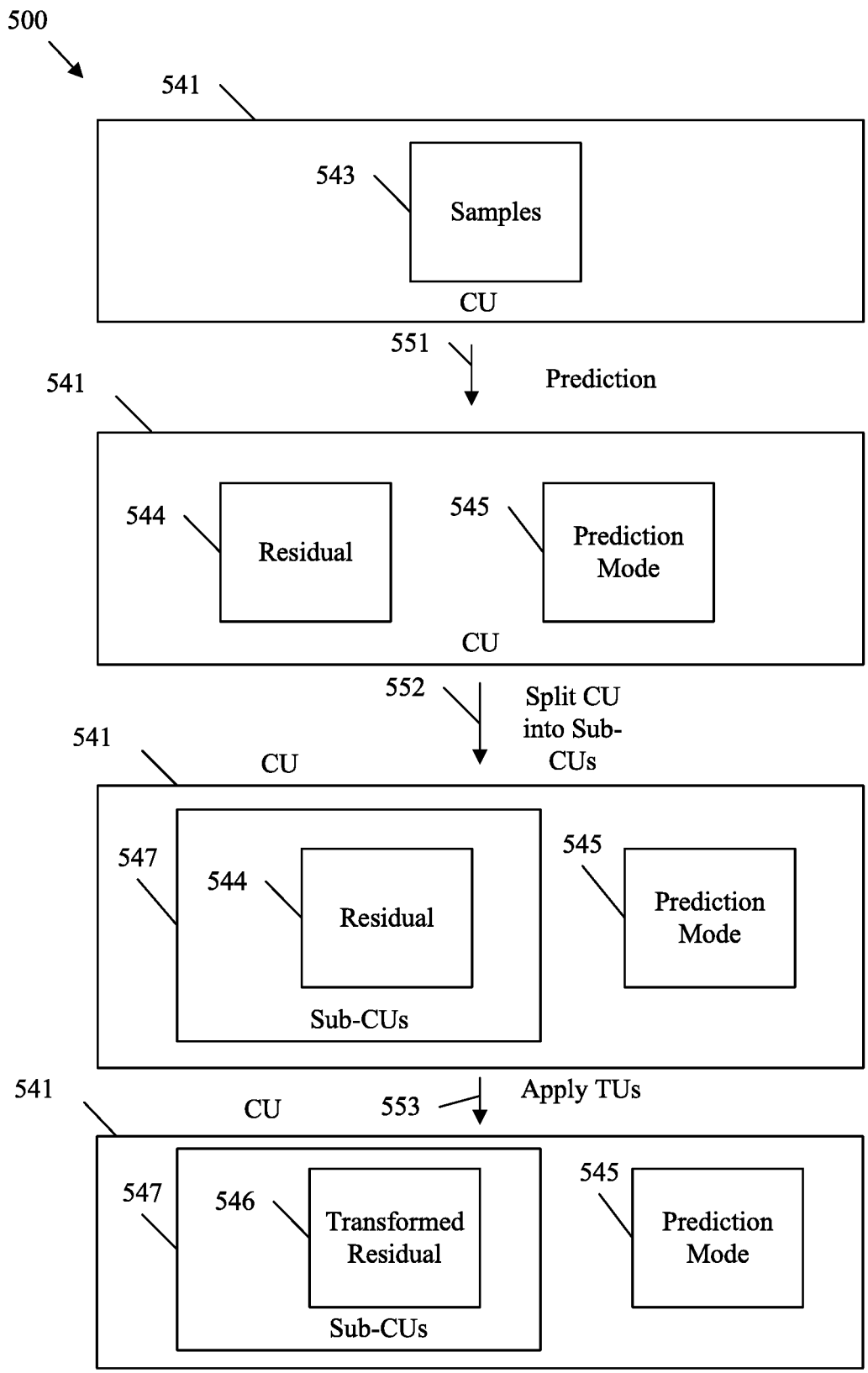
FIG. 5 is a schematic diagram illustrating an example mechanism of splitting CUs into sub-CUs during video coding.

FIG. 5 is a schematic diagram illustrating an example mechanism 500 of splitting CUs into sub-CUs during video coding. Mechanism 500 may be employed by method 100, codec system 200, encoder system 300, and/or decoder system 400 when coding video frames. Mechanism 500 depicts the process of encoding a CU 541 from the top of FIG. 5 to the bottom of FIG. 5. However, the process of decoding a CU 541 can be understood by reversing the arrows and reviewing FIG. 5 from the bottom to the top instead of from the top to the bottom.

At an encoder, a video frame is received and partitioned into one or more slices. A slice is a spatially distinct region of a frame that is encoded separately from other regions in the same frame. The slices are divided into CTUs. A CTU is the largest block of pixels that can accept application of a complete coding tree (e.g., a coding tree does not generally span across CTU boundaries). A coding tree includes one or more nodes and each node is associated with a split mode. When applied to a CTU, the coding tree applies split modes to recursively subdivide the CTU into progressively smaller blocks. A CU 541 is the result of the application of a coding tree to a CTU. A CU 541 is a group of samples 543 that have been split by a coding tree until all coding tree nodes have been applied and leaf nodes have been reached. Hence, a CU 541 is the smallest division of samples 543 that can be obtained by a coding tree. A CU 541 contains sufficient information to encode or decode, depending on context, a block of pixels. Specifically, a CU 541 contains luma samples and chroma samples (including red difference chroma (Cr) and blue difference chroma (Cb) samples) prior to encoding, which can be employed to represent light values and color values of pixels in a block of a video frame.

Prediction 551 is applied to encode the samples 543 of the CU 541. Prediction 551 can include intra-prediction or inter-prediction, but the present example focuses on intra-prediction. As discussed above, intra-prediction uses a reference block in the same frame to predict a current block of samples 543 in the CU 541. In intra-prediction, a prediction mode 545 is selected to represent the samples 543 of the CU 541. The prediction mode 545 indicates one or more reference samples to predict the samples 543. In this way the CU 541 can be encoded as a single prediction mode 545 instead of coding all of the samples 543. In many cases, the reference samples are different than the samples 543 of the CU 541. Any difference between the reference samples indicated by the prediction mode 545 and the samples 543 is retained as residual 544. The residual 544 may include residual samples and/or residual blocks, depending on context. Accordingly, the samples 543 of a CU 541 can be reconstructed from the residual 544 and the prediction mode 545.

The mechanism 500 can then split 552 the CU 541 into sub-CUs 547. The process of splitting 552 the CU 541 into sub-CUs 547 is described in more detail below. For example, the CU 541 can be split 552 when the CU 541 is larger than the maximum size. Accordingly, the CU 541 is split 552 to allow multiple TUs to be tiled onto the CU 541 at sub-CU 547 boundaries. This in turn ensures that the residual 544 is completely covered by the TUs and hence completely transformed. As such, a sub-CU 547 is a portion of a CU 541 that is less than or equal to a maximum TU size (e.g., in height and/or width). The split 552 may be performed according to a split 552 mechanism selected based on CU 541 size and max TU size. It should be noted that in some cases the residual 544 is determined prior to splitting 552 the CU 541 into sub-CUs 547 as shown. In other examples, splitting 552 the CU 541 into sub-CUs 547 can occur after the prediction mode 545 for the CU 541 is determined and before the residual 544 is determined. In such a case, the prediction mode 545 for the entire CU 541 is applied to each of the sub-CUs 547. The residual 544 is then determined for the sub-CUs 547 based on the prediction mode 545.

TUs are then applied 553 to the residual 544 based on the boundaries of the sub-CUs 547. Applying 553 the TUs includes determining coefficients that would modify a predetermined signal, such as a discrete cosine wave, to fit a pattern of the residual 544. Hence, such coefficients can be saved as the transformed residual 546. This is because an inverse transform can be applied to the coefficients of the transformed residual 546 to recreate the residual 544. Accordingly, the encoded CU 541 includes a prediction mode 545 and one or more sub-CUs 547 that include coefficients that act as transformed residual 546. The prediction mode 545 and the transformed residual 546 of the CU 541 provide sufficient information to reconstruct the samples 543 of the CU 541. The CU 541 may also contain any syntax elements desired to describe the coding process in sufficient detail to decode the CU 541. For example, the CU 541 can contain flags or other coding objects to support reconstruction of the samples 543.

A decoder can perform mechanism 500 substantially in reverse to recover the samples 543 for the CU 541. For example, a decoder can receive the transformed residual 546 and the prediction mode 545 from a bitstream. The decoder can split 552 the CU 541 into sub-CUs 547 and apply 553 inverse TUs to the sub-CUs 547 to obtain the residual 544 from the transformed residual 546. The decoder can also perform prediction 551 by employing the prediction mode 545 to determine reference samples. The reference samples can be compared to the residual 544 to obtain the samples 543 for the CU 541, which can be employed to reconstruct the CU 541, the CTUs, the slices, and the frames of the video.

Figure 6:
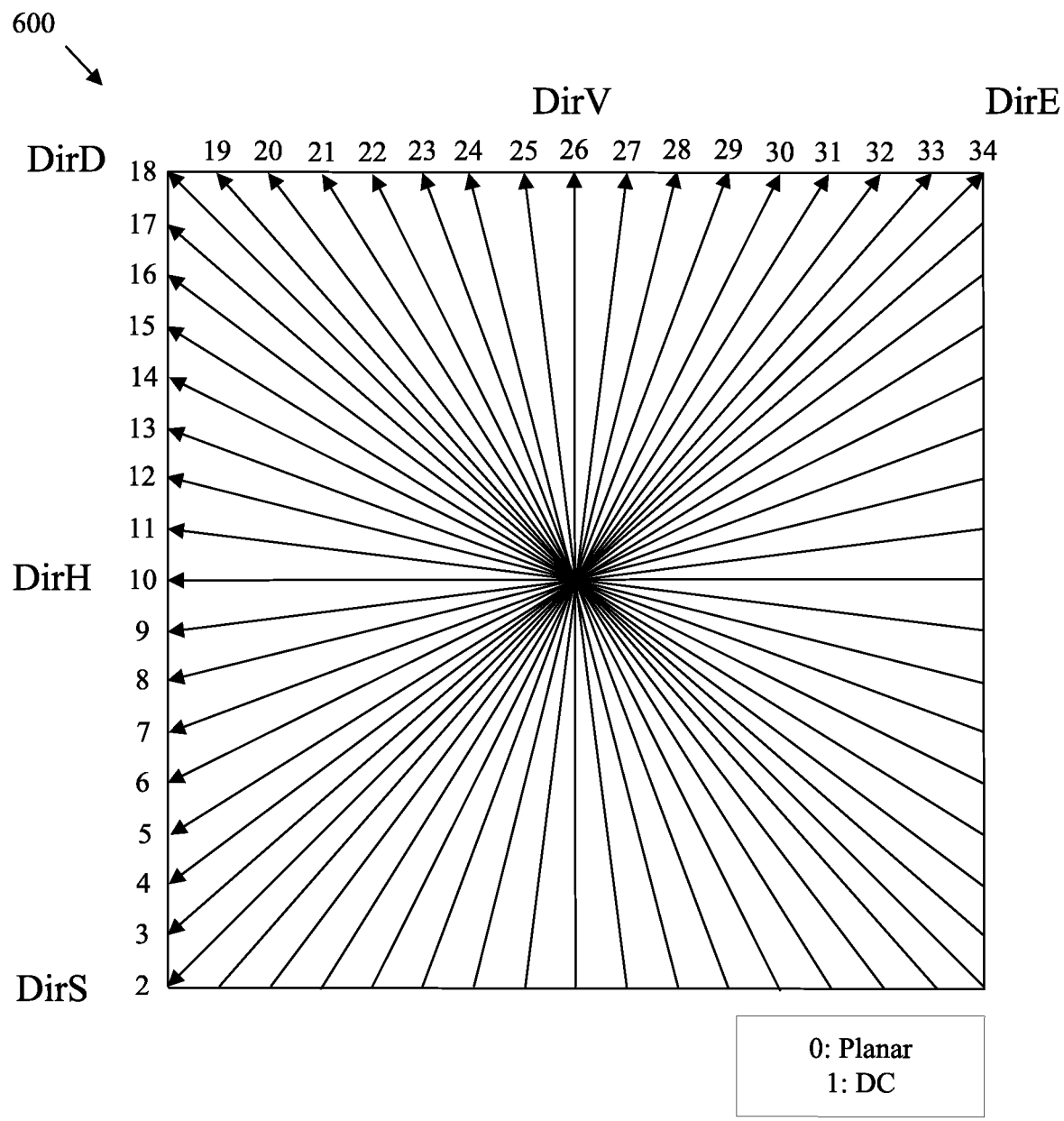
FIG. 6 is a schematic diagram illustrating an example of intra-prediction modes.

FIG. 6 is a schematic diagram illustrating an example of intra-prediction modes 600 as employed in video coding. For example, intra-prediction modes 600 may be employed by steps 105 and 113 of method 100, intra-picture estimation component 215 and an intra-picture prediction component 217 of codec system 200, intra-picture prediction component 317 of encoder 300, and/or intra-picture prediction component 417 of decoder 400. Further, prediction mode 545 of mechanism 500 can select from intra-prediction modes 600 to encode samples in a CU 541 by reference to other reference samples (e.g., leaving a residual 544 that can be compressed/transformed by a TU).

As noted above, intra-prediction involves matching one or more samples in a CU to one or more reference samples of one or more neighboring blocks. The CU can then be represented as a selected prediction mode index and a residual block, which is much smaller than representing all of the luma/chroma values contained in the CU. Intra-prediction can be used when there is no available reference frame, or when inter-predication coding is not used for the current block, slice, and/or frame. The reference samples for intra-prediction may be derived from neighboring blocks in the same frame. Advanced Video Coding (AVC), also known as H.264, and H.265/HEVC both employ a reference line of boundary samples of adjacent blocks as reference samples for intra-prediction. In order to cover different textures or structural characteristics many different intra-prediction modes are employed. H.265/HEVC supports a total of thirty five intra-prediction modes 600 that spatially correlate a current block of samples to one or more reference samples. Specifically, intra-prediction modes 600 include thirty-three directional prediction modes indexed as modes two through thirty four, a direct current (DC) mode indexed as mode one, and a planar mode indexed as mode zero.

During encoding, the encoder matches the luma/chroma values of a current block in a CU with the luma/chroma values of corresponding reference samples in a reference line across the edges of neighboring blocks. When the best match is found with one of the reference lines, the encoder selects one of the directional intra-prediction modes 600 that points to the best matching reference line. For clarity of discussion, acronyms are employed below to reference particular directional intra-prediction modes 600. DirS denotes the starting directional intra-prediction mode when counting clockwise from the bottom left (e.g., mode two in HEVC). DirE denotes the ending directional intra-prediction mode when counting clockwise from the bottom left (e.g., mode thirty four in HEVC). DirD denotes the middle directional intra-coding mode when counting clockwise from the bottom left (e.g., mode eighteen in HEVC). DirH denotes a horizontal intra-prediction mode (e.g., mode ten in HEVC). DirV denotes a vertical intra-prediction mode (e.g., mode twenty six in HEVC).

DC mode acts as a smoothing function and derives a prediction value of a block in the CU as an average value of all the reference samples in the reference line traversing the neighboring blocks. Planar mode returns a prediction value that indicates a smooth transition (e.g., constant slope of values) between samples at the bottom and top left or top left and top right of the reference line of reference samples.

For planar, DC, and prediction modes from DirH to DirV, the samples in both the top row of the reference line and the left column of the reference line are used as reference samples. For prediction modes with prediction directions from DirS to DirH (including DirS and DirH), the reference samples in the neighboring blocks on the left column of the reference line are used as reference samples. For prediction modes with prediction directions from DirV to DirE (including DirV and DirE), the reference samples of the neighboring blocks on the top row of the reference line are used as reference samples. Accordingly, intra-prediction modes 600 can be used to indicate a spatial and/or directional relationship between samples and one or more reference samples.

Figure 7:
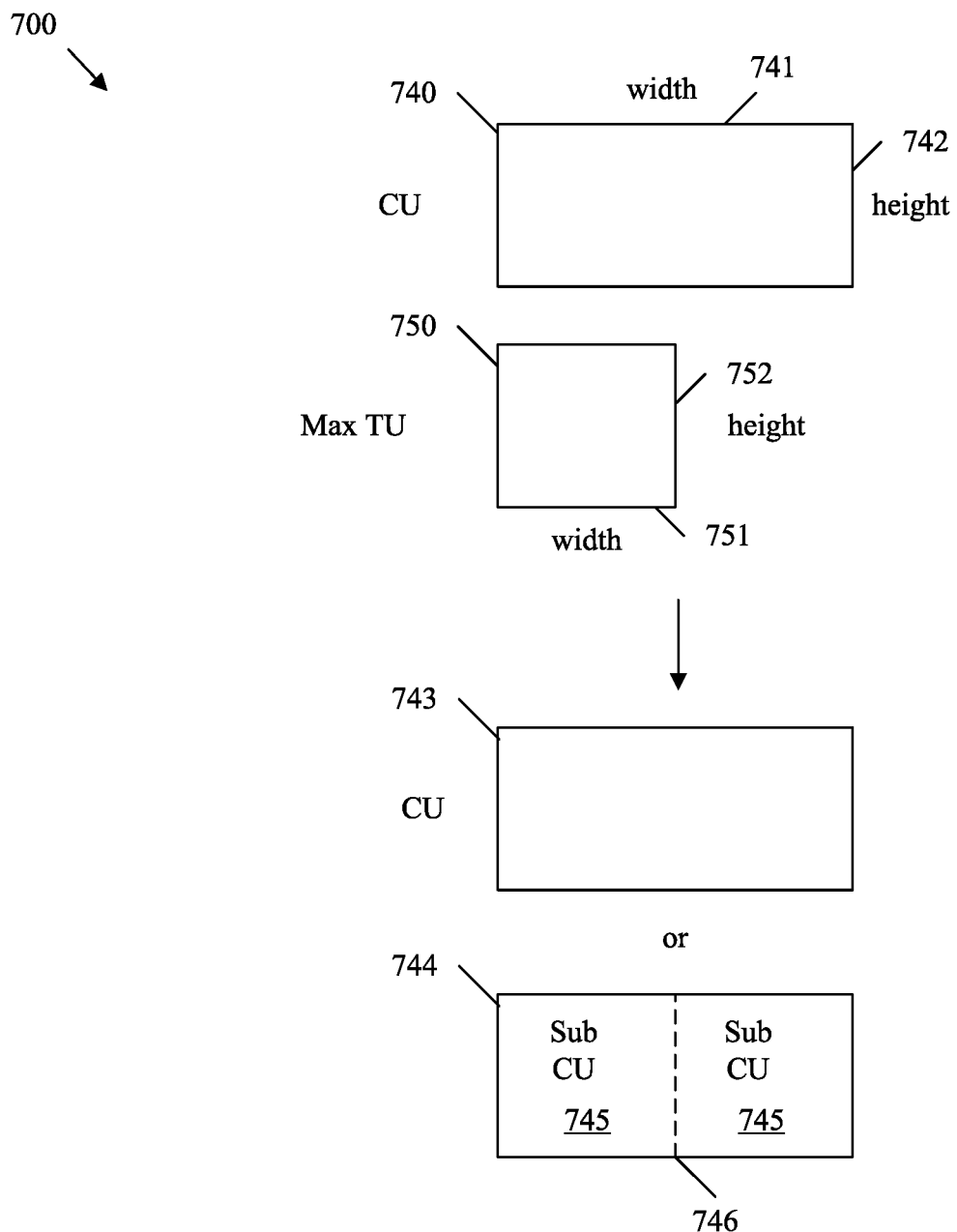
FIG. 7 is a schematic diagram illustrating an example split mechanism for application to a CU selected by comparing CU dimensions to max TU dimensions.

FIG. 7 is a schematic diagram illustrating an example split mechanism 700 for application to a CU 740 selected by comparing CU 740 dimensions to max TU 750 dimensions. For example, split mechanism 700 can be applied by method 100, codec system 200, encoder system 300, and/or decoder system 400 when coding video frames. As a specific example, split mechanism 700 can be applied as a split 552 in mechanism 500. Further, split mechanism 700 can be applied in conjunction with selection of one of the intra-prediction modes 600 and application of a TU to encode and/or decode a CU.

As noted above, a split mechanism 700 can be selected to split a CU 740 into sub-CUs 745 for application of one or more TUs. Specifically, the split mechanism 700 is selected by comparing a width 741 of the CU 740 to a width 751 of a max TU 750 and comparing a height of the CU 740 to a height 752 of the max TU 750. A CU 740 and a sub-CU 745 may be substantially similar to a CU 541 and a sub-CU 547, respectively.

In the case shown in FIG. 7, a size of a first side of the CU 740, in this case the CU width 741, is greater than to a size of a first side of the max TU 750, in this case the max TU width 751. Further, a size of a second side of the CU 740, in this case the CU height 742, is less or equal to than a size of a second side of the max TU 750, in this case the max TU height 752. Based on the determination that the size of the first side of the CU 740 is greater than the size of the first side of the max TU 750 and the size of the second side of the CU 740 is less than or equal to the size of the second side of the max TU 750, two options are available. In general, if any one side of a current CU is larger than any one side of a max TU and/or a second side of the current CU size is smaller than a second side of max the TU, one of the following solutions may be employed to split the CU. According to a first method, the side of the CU which is larger than the max side of TU is split according to the any one side size of the TU which is smaller than the max side of the TU into one or more sub-CUs sizes. According to a second method the side of CU which is larger than the max side of TU is split into one or more sub-CUs. According to a third method, a flag is used to indicate which method (e.g. either the first method or the second method) is used to split the side of CU which is larger than the max side of TU.

For the first option, a determination is made whether to split the CU 740 according to the smaller side of the CU 740 (e.g., the height 742 of the CU 740). Specifically, a determination is made whether splitting the CU 740 in a direction perpendicular to the smaller side (e.g., parallel to the larger side) would increase the coverage of the TU 750. However, as shown in FIG. 7, splitting the CU 740 in this manner would not increase the coverage of the TU 750. As such, no splitting occurs, which results in a CU 743.

For the second option, a determination is made whether to split the CU 740 along the larger side of the CU 740 (e.g., the width 741 of the CU 740). Specifically, a determination is made whether splitting the CU 740 perpendicular to the larger side (e.g., parallel to the smaller side) would increase the coverage of the TU 750. As shown in FIG. 7, splitting the CU 740 in this manner would increase the coverage of the TU 750. Therefore, a sub-CU split 746 is made perpendicular to the larger side of the CU 740. The sub-CU split 746 creates sub-CUs 745, which convert the CU 740 into CU 744.

An encoder can encode a flag or other syntax in the bitstream to indicate which split mechanism 700 is selected for the CU 740, which results in either CU 743 or CU 744. Further, a decoder can read the flag or other syntax and perform the corresponding split. In another example, the encoder and decoder can both perform split mechanism 700 based on common set of predetermined rules.

The split mechanism 700 as shown is applied to CU 740 with a width 741 of one hundred twenty eight pixels and a height 742 of sixty four pixels and a max TU 750 with a width 751 of sixty four pixels and a height 752 of sixty four pixels. The first example does not partition and hence does not change the CU 740 size. The second example results in sub-CUs 745 of sixty four by sixty four pixels. TU(s) can be placed onto the boundaries created by the sub-CUs to transform residual samples positioned in such sub-CUs.

As another case, a CU 740 may include a width 741 of one hundred twenty eight pixels and a height 742 of sixty four pixels and a max TU 750 may include a width 751 of thirty two pixels and a height 752 of thirty two pixels. According, the width 741 and the height 742 of the CU 740 are both larger than the width 751 and height 752 of the CU 740. In such a case, the CU 740 can be split perpendicular to the larger side, perpendicular to the smaller side, or both. In a first example, the CU 740 can be split perpendicular to the smaller side, in this case height 742, as such a split increases TU coverage. The first example results in two sub-CUs 745 of one hundred twenty eight by thirty two pixels. In a second example, the CU 740 can be split perpendicular to both the smaller side and the larger side, in this case height 742 and width 751, as such splits increase TU coverage. The second example may result in eight sub-CUs 745 of thirty two by thirty two pixels. As with previous cases/examples, a flag or other syntax can be coded into the bitstream to indicate which split mechanism 700 is selected for the CU 740.

Figure 8:
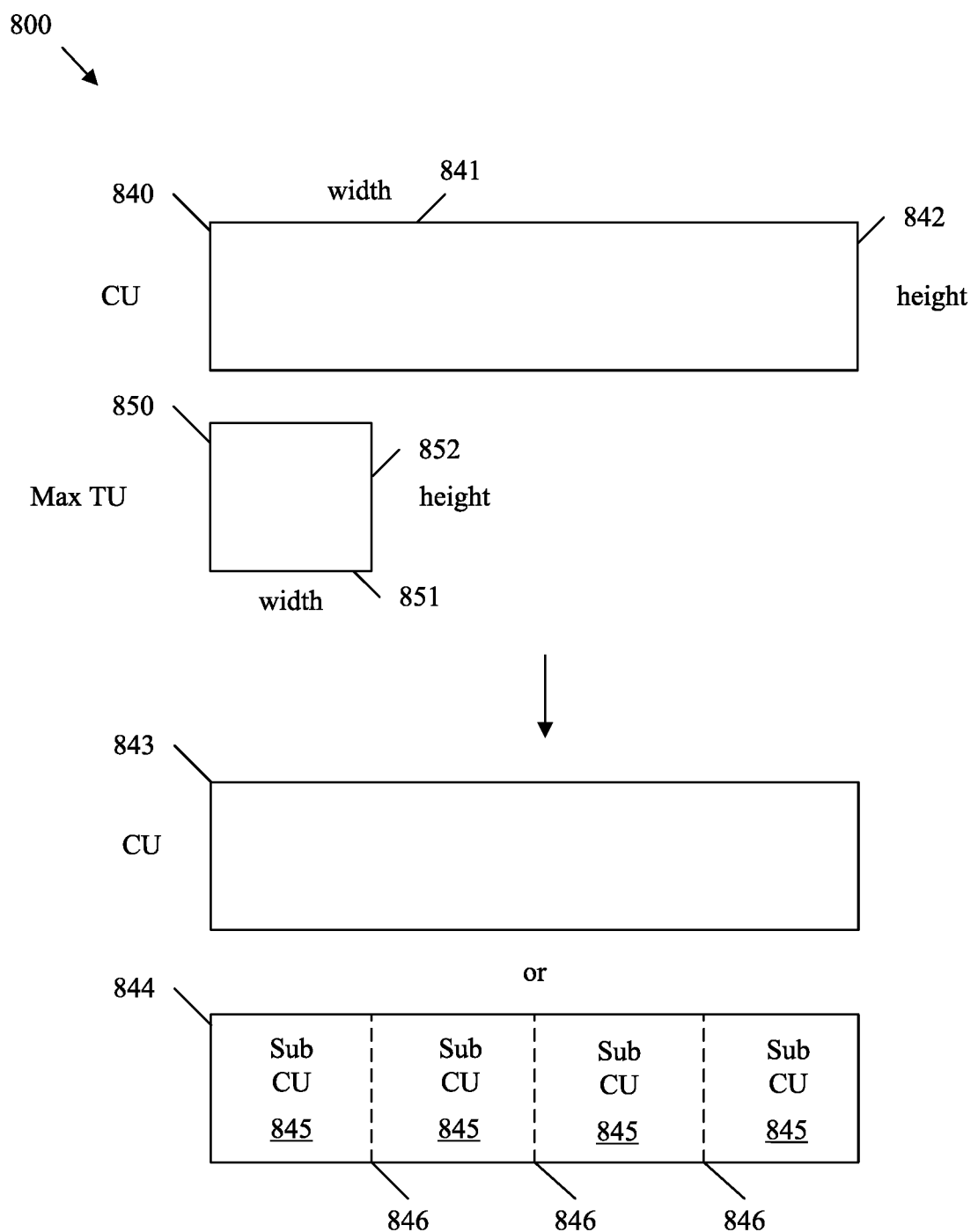
FIG. 8 is a schematic diagram illustrating another example split mechanism for application to a CU selected by comparing CU dimensions to max TU dimensions.

FIG. 8 is a schematic diagram illustrating another example split mechanism 800 for application to a CU 840 selected by comparing CU 840 dimensions to max TU 850 dimensions. For example, split mechanism 800 can be applied by method 100, codec system 200, encoder system 300, and/or decoder system 400 when coding video frames. As a specific example, split mechanism 800 can be applied as a split 552 in mechanism 500. Further, split mechanism 800 can be applied in conjunction with selection of one of the intra-prediction modes 600 and application of a TU to encode and/or decode a CU.

Split mechanism 800 is similar to split mechanism 700 but applied to a CU 840 of a different size. Split mechanism 800 is applied to a CU 840 with a width 841 and a height 842 based on a max TU 850 with a width 851 and a height 852, which are substantially similar to CU 740, width 741, height 742, max TU 750, width 751, and height 752, respectively. The CU 840 has a width 841 of one hundred twenty eight pixels and a height 842 of thirty two pixels and a max TU 850 with a width 851 of thirty two pixels and a height 852 of thirty two pixels.

In the case shown in FIG. 8, a size of a first side of the CU 840, in this case the CU width 841, is greater than a size of a first side of the max TU 850, in this case the max TU width 851. Further, a size of a second side of the CU 840, in this case the CU height 842, is less than or equal to a size of a second side of the max TU 850, in this case the max TU height 852. Based on the determination that the size of the first side of the CU 840 is greater than the size of the first side of the max TU 850 and the size of the second side of the CU 840 is less than or equal to the size of the second side of the max TU 850, two options are available.

For the first option, a determination is made whether to split the CU 840 according to the smaller side of the CU 840 (e.g., the height 842 of the CU 840). Specifically, a determination is made whether splitting the CU 840 perpendicular to the smaller side (or parallel to the larger side) would increase the coverage of the TU 850. However, as shown in FIG. 8, splitting the CU 840 in this manner would not increase the coverage of the TU 850. As such, no splitting occurs, which results in a CU 843.

For the second option, a determination is made whether to split the CU 840 according to the larger side of the CU 840 (e.g., the width 841 of the CU 840). Specifically, a determination is made whether splitting the CU 840 perpendicular to the larger side (or parallel to the smaller side) would increase the coverage of the TU 850. As shown in FIG. 8, splitting the CU 840 in this manner would increase the coverage of the TU 850. Therefore, a sub-CU split 846 is made perpendicular to the larger side of the CU 840. The sub-CU split 846 creates sub-CUs 845, which convert the CU 840 into CU 844.

An encoder can encode a flag or other syntax in the bitstream to indicate which split mechanism 800 is selected for the CU 840, which results in either CU 843 or CU 844. Further, a decoder can read the flag or other syntax and perform the corresponding split. The first example does not partition and hence does not change the CU 840 size. The second example results in four equal sub-CUs 845 of thirty two by thirty two pixels.

TU(s) can be placed onto the boundaries created by the sub-CUs to transform residual samples positioned in such sub-CUs. An encoder can encode a flag or other syntax in the bitstream to indicate which split mechanism 800 is selected for the CU 840, which results in either CU 843 or CU 844. Further, a decoder can read the flag or other syntax and perform the corresponding split. In another example, the encoder and decoder can both perform split mechanism 800 based on a common set of predetermined rules.

Figure 9:
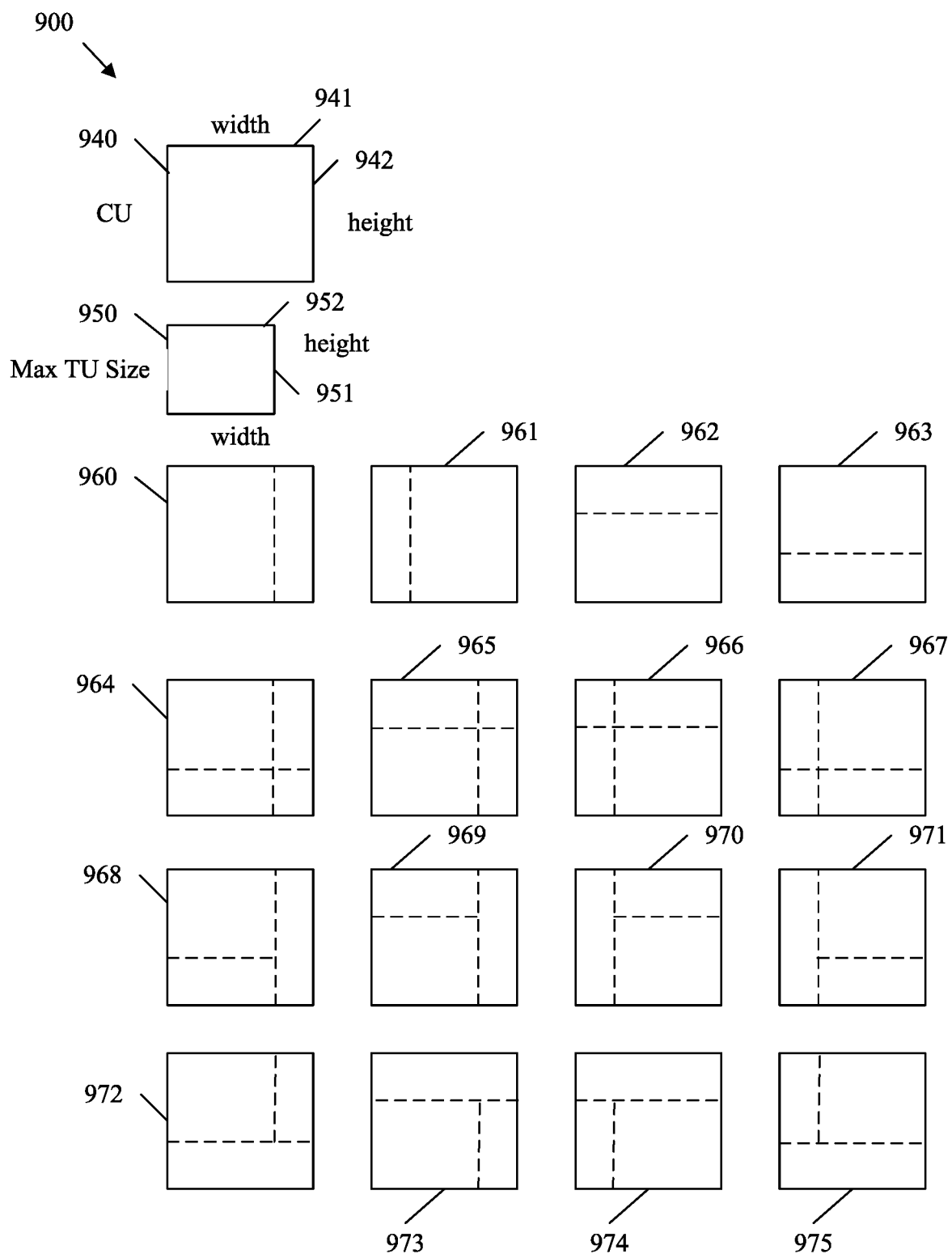
FIG. 9 is a schematic diagram illustrating other example split mechanisms for application to a CU selected by comparing CU dimensions to max TU dimensions.
Figure 10:
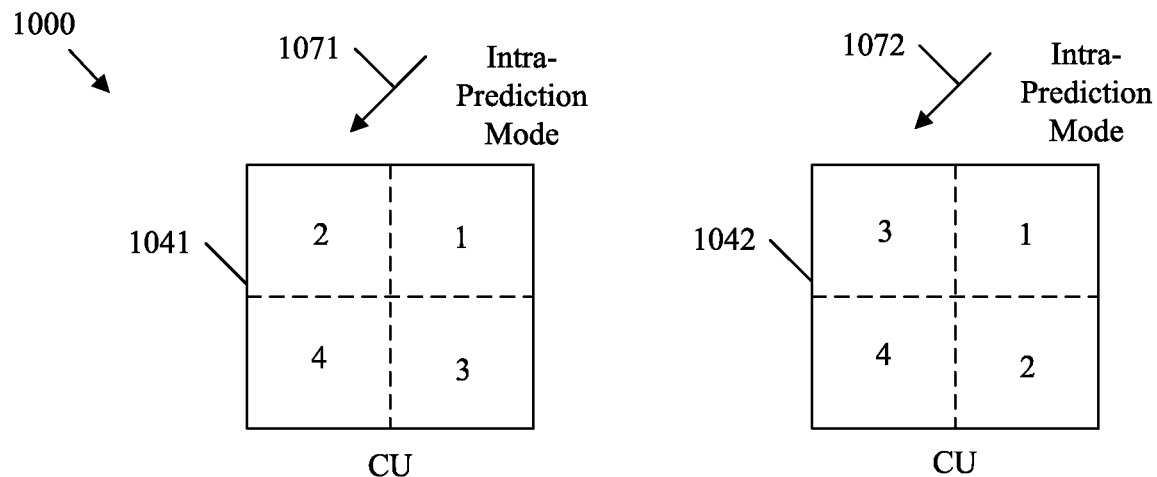
FIGS. 10-15 are schematic diagrams illustrating example mechanisms for applying TUs in order based on selected intra-prediction modes.
Figure 11:
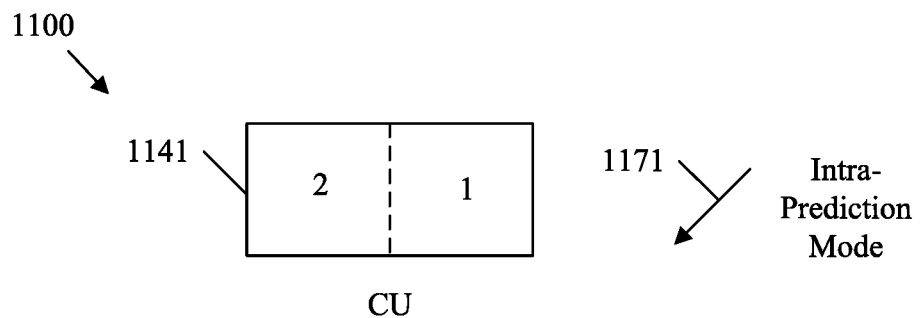
Figure 12:
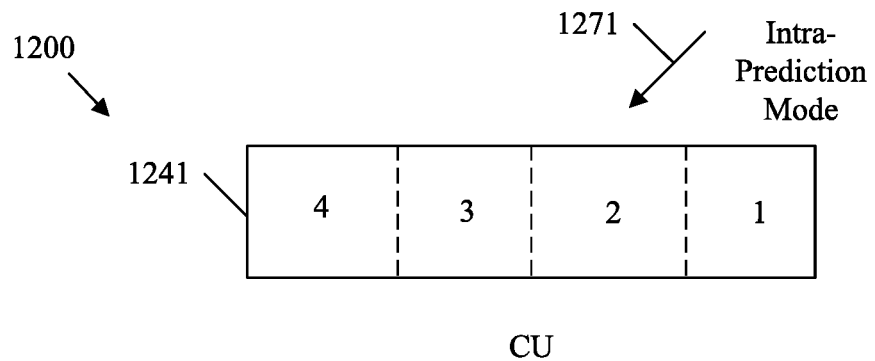
Figure 13:
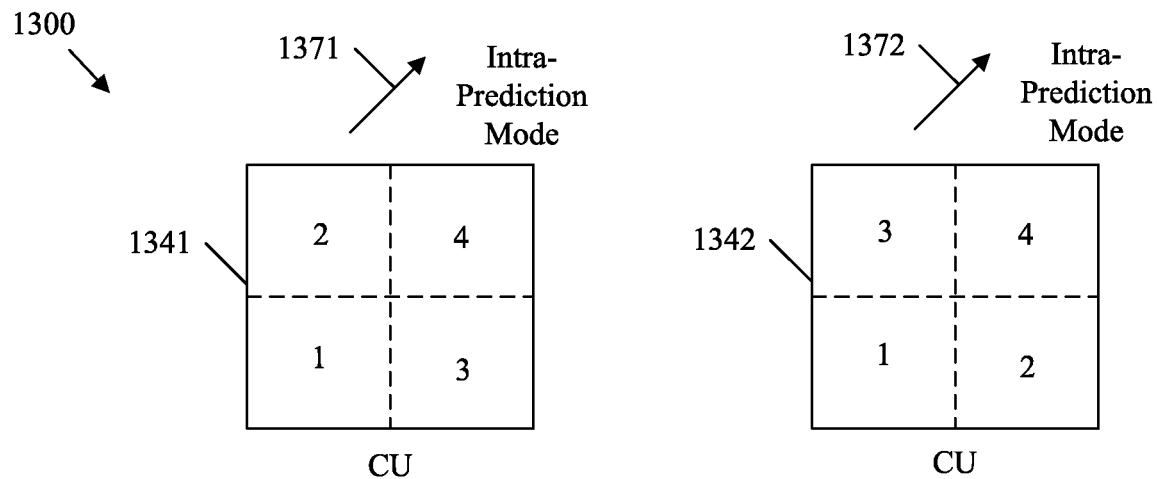
Figure 14:
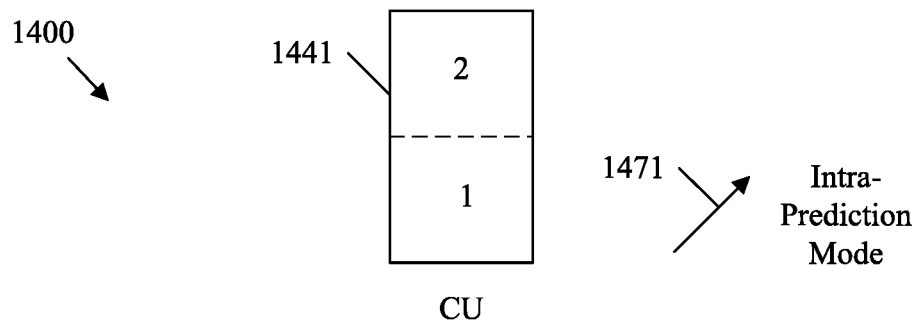
Figure 15:
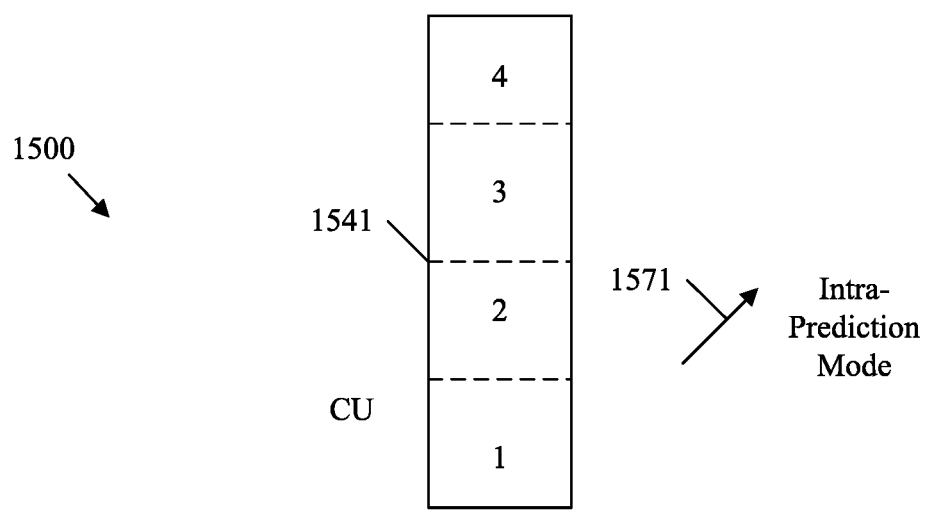

FIG. 9 is a schematic diagram illustrating other example split mechanisms 900 for application to a CU 940 selected by comparing CU 940 dimensions to max TU 950 dimensions. For example, split mechanism 900 can be applied by method 100, codec system 200, encoder system 300, and/or decoder system 400 when coding video frames. As a specific example, split mechanism 900 can be applied as a split 552 in mechanism 500. Further, split mechanism 900 can be applied in conjunction with selection of one of the intra-prediction modes 600 and application of a TU to encode and/or decode a CU.

Split mechanism 900 is similar to split mechanisms 700 and 800 but applied to a CU 940 of a different size. Split mechanism 900 is applied to a CU 940 with a width 941 and a height 942 based on a max TU 950 with a width 951 and a height 952, which are substantially similar to CU 740, width 741, height 742, max TU 750, width 751, and height 752, respectively. The CU 940 has a width 941 of ninety six pixels and a height 942 of ninety six pixels and a max TU 950 with a width 951 of sixty four pixels and a height 952 of sixty four pixels.

The split mechanism 900 can be selected to split a CU 940 into sub-CUs for application of one or more TUs. Specifically, the split mechanism 900 is selected by comparing a width 941 of the CU 940 to a width 951 of the max TU 950 and comparing a height 942 of the CU 940 to a height 952 of the max TU 950.

In the case shown in FIG. 9, a size of a first side of the CU 940 is greater than, and not an integer multiple of, a size of a first side of the max TU 950 (e.g., width 941 and width 951, respectively). Further, a size of a second side of the CU 940 is greater than, and not an integer multiple of, a size of a second side of the max TU 950 (e.g., height 942 and height 952, respectively). Based on the determination that the size of the first side of the CU 940 is greater than, and not an integer multiple of, the size of the first side of the max TU 950 (e.g., width 941 and width 951, respectively) and that the size of the second side of the CU 940 is greater than, and not an integer multiple of, the size of the second side of the max TU 950 (e.g., height 942 and height 952, respectively), multiple options are available. A first option is to split the CU 940 by creating sub-CU splits perpendicular to the first CU side size (e.g., width 941) until the first CU side size is smaller than the first max TU side (e.g., width 951) or by creating sub-CU splits perpendicular to the second CU side size (e.g., height 942) until the second CU side size is smaller than the second max TU side (e.g., height 952). This option can create CU 960, CU 961, CU 962, and/or CU 963. In this case, CU 960 contains a sub-CU of sixty four pixels by ninety six pixels and a sub-CU of sixty four pixels by thirty two pixels. CU 961 contains a sub-CU of thirty two pixels by ninety six pixels and a sub-CU of sixty four pixels by ninety six pixels. CU 962 contains a sub-CU of ninety six pixels by thirty two pixels and a sub-CU of ninety six pixels by sixty four pixels. CU 963 contains a sub-CU of ninety six pixels by sixty four pixels and a sub-CU of ninety six pixels by thirty two pixels.

A second option is to split the CU 940 by creating sub-CU splits perpendicular to the first CU side size (e.g., width 941) until the first CU side size is smaller than the first max TU side (e.g., width 951) and by creating sub-CU splits perpendicular to the second CU side size (e.g., height 942) until the second CU side size is smaller than the second max TU side (e.g., height 952). This option can create CU 964, CU 965, CU 966, and/or CU 967. In this case, CU 964, CU 965, CU 966, and CU 967 each contain a sub-CU of sixty four pixels by sixty four pixels, a sub-CU of sixty four pixels by thirty two pixels, a sub-CU of thirty two pixels by sixty four pixels, and a sub-CU of thirty two pixels by thirty two pixels. The sub-CUs are positioned in different positions depending on the sub-CUs splits as shown in FIG. 9.

A third option is to perform the splits like in the second option, however, the sub-CU splits made perpendicular to the first CU side (e.g., width 941) do not further split any sub-CU splits made perpendicular to the second CU side (e.g., height 942), and vice versa. This approach can create CU 968, CU 969, CU 970, CU 971, CU 972, CU 973, CU 974 and/or CU 975. In this case CU 968, CU 969, CU 970, CU 971, CU 972, CU 973, CU 974 and CU 975 each contain a sub-CU of sixty four pixels by sixty four pixels. CU 968, CU 969, CU 970, and CU 971 also contain a sub-CU of ninety six pixels by thirty two pixels and a sub-CU of thirty two pixels by sixty four pixels. Further, CU 972, CU 973, CU 974, and CU 975 also contain a sub-CU of thirty two pixels by ninety six pixels and a sub-CU of sixty four pixels by thirty two pixels. The sub-CUs are positioned in different positions depending on the sub-CUs splits as shown in FIG. 9.

TU(s) can be placed onto the boundaries created by the sub-CUs to transform residual samples positioned in such sub-CUs. An encoder can encode a flag or other syntax in the bitstream to indicate which split mechanism 900 is selected for the CU 940, which results in CU 960-CU 975. For example, syntax can be used to indicate the location of the biggest sub-CU, the smallest sub-CU, the mid-size sub-CU, or combinations thereof. Further, a decoder can read the flag or other syntax and perform the corresponding split. In addition, a flag may be employed to indicate whether split mechanism 700, 800, and/or 900 is employed. In another example, the encoder and decoder can both perform split mechanism 900 based on a common set of predetermined rules.

If a CU side length in each dimension is larger than the max transform length, the CU side length is tiled by the max transform length. Intra-prediction operates at the transform block size by applying the prediction mode established at the CU size. The operation order of each transform block can be zig-zagged. The reconstructed samples of top and/or left TUs can be used as reference samples for the right and/or bottom TUs.

FIGS. 10-15 are schematic diagrams illustrating example mechanisms 1000, 1100, 1200, 1300, 1400, and 1500 for applying TUs in order based on selected intra-prediction modes. Specifically, the operation order of each transform block in such mechanisms is applied adaptively based on the intra-prediction angle. Such mechanisms can be applied by method 100, codec system 200, encoder system 300, and/or decoder system 400 when coding video frames. Further mechanisms 1000, 1100, 1200, 1300, 1400, and 1500 can be used to apply 553 TUs as part of mechanism 500. As such, mechanisms 1000, 1100, 1200, 1300, 1400, and 1500 can be applied in conjunction with split mechanisms 700, 800, and/or 900. Specifically, mechanisms 1000, 1100, 1200, 1300, 1400, and 1500 can apply TUs to transform residual of a CU based on results of a selected split mechanism 700, 800, and/or 900 by applying the TUs in an order based on the intra-prediction modes 600 selected for the CU.

Specifically, mechanisms 1000, 1100, 1200, 1300, 1400, and 1500 each initially apply a first TU positioned opposite of the direction pointed to by the intra-prediction mode for a CU. The TUs are then applied in an order. Finally, a last TU positioned in the direction pointed to by the intra-prediction mode is applied. Applying the TUs in this manner allows samples in a CU to be used as reference samples for other samples in the same CU.

For example, in mechanism 1000 a CU 1041 is split into four sub-CUs. Further, an intra-prediction mode 1071 angle is down-left. In this case, the operation order for intra-prediction for each TU is top right, top left, bottom right, and bottom left. As another example, a CU 1042 is split into four sub-CUs. Further, an intra-prediction mode 1072 angle is down-left. In this example, the operation order for intra-prediction for each TU is top right, bottom right, top left, and bottom left. In either case, the reconstructed samples of top-right TU can be used as reference samples for top-left and bottom-right TUs. Further, the reconstructed samples of top-left and bottom-right TUs can be used as reference samples for bottom-left TU.

As another example, in mechanism 1100 a CU 1141 is vertically split into two sub-CUs. Further, an intra-prediction mode 1171 angle is down-left. In this example, the operation order for intra-prediction for each TU is right and then left. The reconstructed samples of right TU can be used as reference samples for left TUs.

As another example, in mechanism 1200 a CU 1241 is vertically split into four sub-CUs. Further, an intra-prediction angle mode 1271 angle is down-left. In this example, the operation order for intra-prediction for each TU is right, center right, center left, and then left. The reconstructed samples of right TUs can be used as reference samples for the left TUs.

As yet another example, in mechanism 1300 a CU 1341 is quarterly split into four sub-CUs. Further, an intra-prediction mode 1371 angle is top-right. In this example, the operation order for intra-prediction for each TU can be bottom left, top left, bottom right, and then top right. In another example, a CU 1342 is quarterly split into four sub-CUs. Further, an intra-prediction mode 1372 angle is top-right. The operation order for intra-prediction for each TU can be bottom left, bottom right, top left, and then top right. Regardless of the example used in mechanism 1300, the reconstructed samples of bottom-left TU can be used as reference samples for top-left and bottom-right TUs. Also, the reconstructed samples of top-left and bottom-right TUs can be used as reference samples for top-right TU.

As yet another example, in mechanism 1400 a CU 1441 is horizontally split into two sub-CUs. Further, an intra-prediction mode 1471 angle is top-right. In this example, the operation order for intra-prediction for each TU is bottom and then top. The reconstructed samples of bottom TU can be used as reference samples for the top TU.

As yet another example, in mechanism 1500 a CU 1541 is horizontally split into four sub-CUs. Further, an intra-prediction mode 1571 angle is top-right. In this example, the operation order for intra-prediction for each TU is bottom, center bottom, center top, and then top. The reconstructed samples of bottom TUs can be used as reference samples for top TUs.

Figure 16:
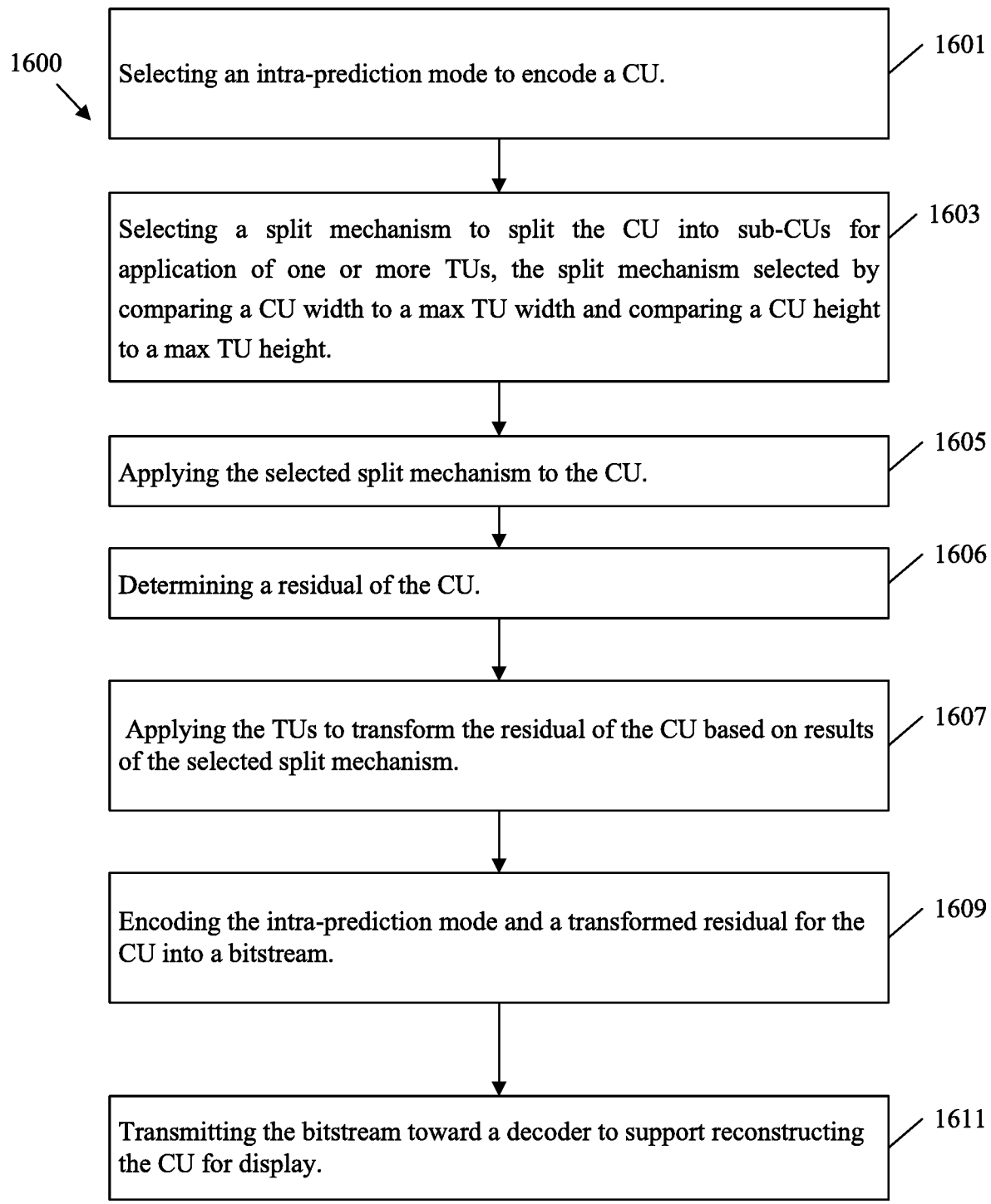
FIG. 16 is a flowchart of an example method of selecting a split mechanism for application to a CU at an encoder by comparing CU dimensions to max TU dimensions.

FIG. 16 is a flowchart of an example method 1600 of selecting a split mechanism for application to a CU at an encoder by comparing CU dimensions to max TU dimensions. For example, method 1600 may be applied in conjunction with method 100, for example by a codec system 200 and/or an encoder 300. Further, method 1600 may be employed to implement mechanism 500 and select from intra-prediction modes 600. In addition, method 1600 can select and apply split mechanisms 700, 800, and/or 900. Further, method 1600 may apply TUs to sub-CUs (created by the split mechanisms) according to mechanisms 1000, 1100, 1200, 1300, 1400, and/or 1500.

Method 1600 may be initiated for a current CU during block compression. At step 1601, an intra-prediction mode is selected to encode the CU, for example from intra-prediction modes 600. The intra-prediction mode can be selected according to rate distortion optimization. For example, the encoder can attempt multiple intra-prediction modes and select the intra-prediction mode that results in the best tradeoff between coding efficiency and loss of accuracy.

At step 1603, a split mechanism is selected to split the CU into sub-CUs for application of one or more TUs. The split mechanism is selected by comparing a CU width to a max TU width and comparing a CU height to a max TU height. For example, when a first CU side size is greater than a first max TU side size, and a second CU side size is less than or equal to a second max TU side size, a split mechanism 700 and/or 800 can be employed. Specifically, the method 1600 can select and implement method 1800 as discussed below. As another example, the method 1600 can determine that a first CU side size is greater than, and is not an integer multiple of, a first max TU side size, and that a second CU side size is greater than, and is not an integer multiple of, a second max TU side size. In such a case, the method 1600 may employ split mechanism 900. Specifically, the method 1600 can select and implement method 1900 as discussed below.

At step 1605, the selected split mechanism is applied to the CU to create sub-CUs. Further, at step 1606 the residual of the CU is determined. As noted above, the residual includes a difference between sample values for the CU and reference values indicated by the intra-prediction mode. It should be noted that such reference samples can also be referred to as prediction samples. It also should be noted that in some examples, step 1606 may occur before step 1605. Specifically, in some examples the residual is determined for the CU and then the CU is split into sub-CUs that contain residual samples contained in corresponding locations of the CU. In other examples, the CU is split into sub-CUs and then the intra-prediction mode selected for the CU is applied to each sub-CU to determine the residual samples for the sub-CUs.

At step 1607, the one or more TUs are applied to the sub-CUs to transform the residual of the CU based on results of the selected split mechanism. In some cases, applying the TUs to transform the residual of the CU based on the results of the selected split mechanism can include applying the TUs in an order based on the intra-prediction mode (e.g., according to mechanisms 1000, 1100, 1200, 1300, 1400, and/or 1500). For example, the intra-prediction mode points in a direction. Applying the TUs in an order based on the intra-prediction mode can include first applying a first TU positioned opposite of the direction pointed to by the intra-prediction mode, and then applying a last TU positioned in the direction pointed to by the intra-prediction mode last.

At step 1609, the intra-prediction mode and the transformed residual for the CU are encoded into a bitstream. A flag or other syntax can also be encoded into the bitstream to indicate the split mechanism selected for the CU at step 1603. Then the bitstream is transmitted toward a decoder to support reconstructing the CU for display at step 1611.

Figure 17:
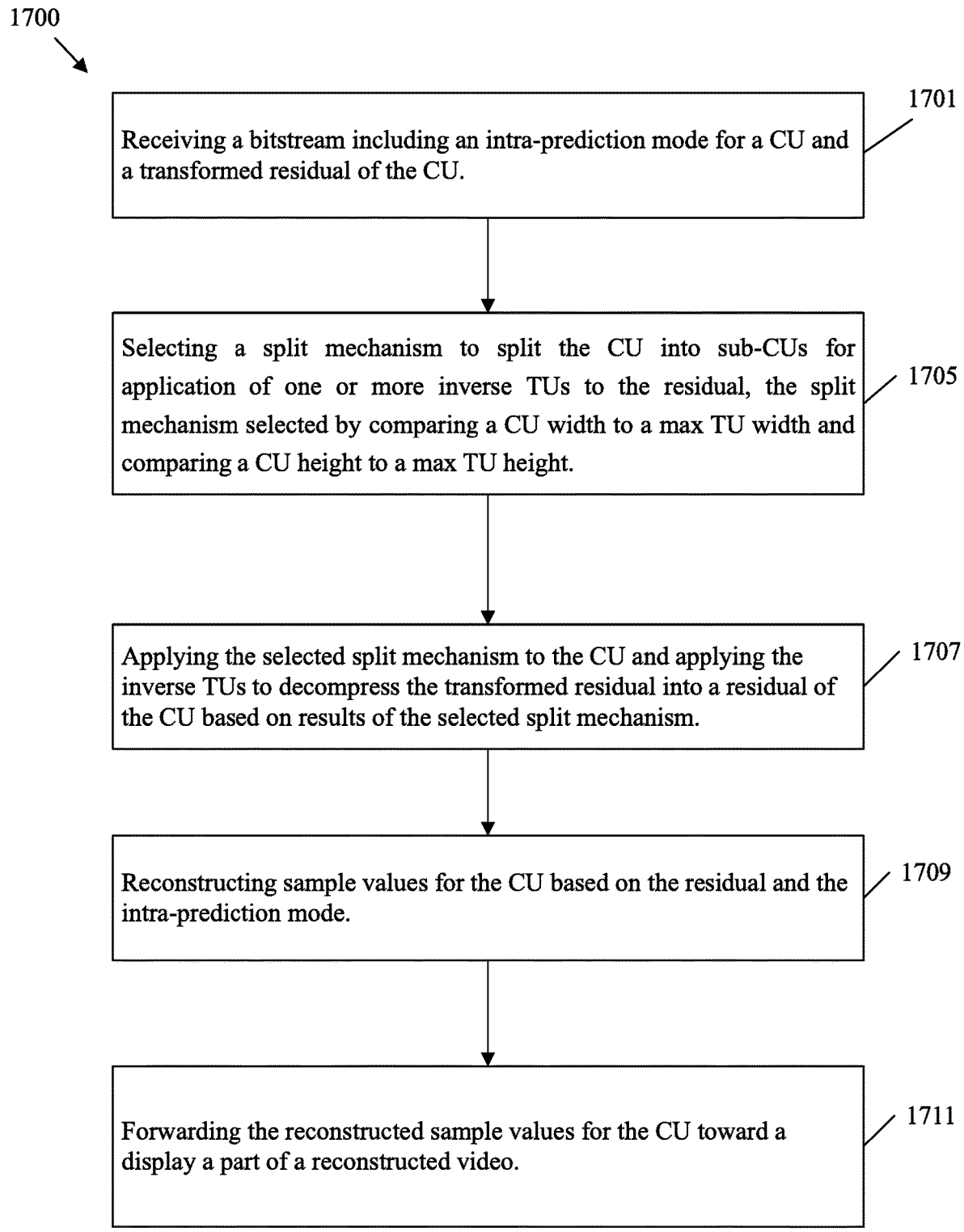
FIG. 17 is a flowchart of an example method of selecting a split mechanism for application to a CU at a decoder by comparing CU dimensions to max TU dimensions.

FIG. 17 is a flowchart of an example method 1700 of selecting a split mechanism for application to a CU at a decoder by comparing CU dimensions to max TU dimensions. For example, method 1700 may be applied in conjunction with method 100, for example by a codec system 200 and/or a decoder 400. Further, method 1700 may be employed to implement mechanism 500 to decode based on intra-prediction modes 600. In addition, method 1700 can select and apply split mechanisms 700, 800, and/or 900. Further, method 1700 may apply TUs to sub-CUs (created by the split mechanisms) according to mechanisms 1000, 1100, 1200, 1300, 1400, and/or 1500.

Method 1700 may be initiated for decoding a current CU for reconstructing a picture to be output. At step 1701, a bitstream is received. The bitstream includes an intra-prediction mode for a CU and a transformed residual of the CU. The transformed residual includes a difference between sample values for the CU and reference values indicated by the intra-prediction mode (e.g., prediction samples) as being transformed by a transform.

At step 1705, a split mechanism is selected to split the CU into sub-CUs for application of one or more inverse TUs to the transformed residual. The split mechanism is selected by comparing a CU width to a max TU width and comparing a CU height to a max TU height. For example, the split mechanism can be selected based on flags and/or syntax signaled from the encoder in the bitstream and based on a determination made at the encoder. As another example, the decoder can make the selection based on predetermined (e.g., default) rules. As an example, when a first CU side size is greater than a first max TU side size, and a second CU side size is less than or equal to a second max TU side size, a split mechanism 700 and/or 800 can be employed. Specifically, the method 1700 can select and implement method 1800 as discussed below. As another example, the method 1700 can determine that a first CU side size is greater than, and is not an integer multiple of, a first max TU side size, and that a second CU side size is greater than, and is not an integer multiple of, a second max TU side size. In such a case, the method 1700 may employ split mechanism 900. Specifically, the method 1700 can select and implement method 1900 as discussed below.

At step 1707, the selected split mechanism is applied to the CU to create sub-CUs. Further, the inverse TUs are applied to the sub-CUs to decompress the transformed residual into a residual of the CU based on results of the selected split mechanism. In some examples, applying the inverse TUs to decompress the transformed residual into a residual of the CU based on results of the selected split mechanism includes applying the inverse TUs in an order based on the intra-prediction mode. In this case, samples in a CU can act as reference samples for other samples in the CU. Applying the inverse TUs in an order based on the intra-prediction mode may include first applying a first inverse TU positioned opposite of the direction pointed to by the intra-prediction mode, and applying a last inverse TU positioned in the direction pointed to by the intra-prediction mode last.

At step 1709, sample values for the CU are reconstructed based on the residual and the intra-prediction mode. The reconstructed sample values for the CU can then be forwarded toward a display as part of a reconstructed video at step 1711.

Figure 18:
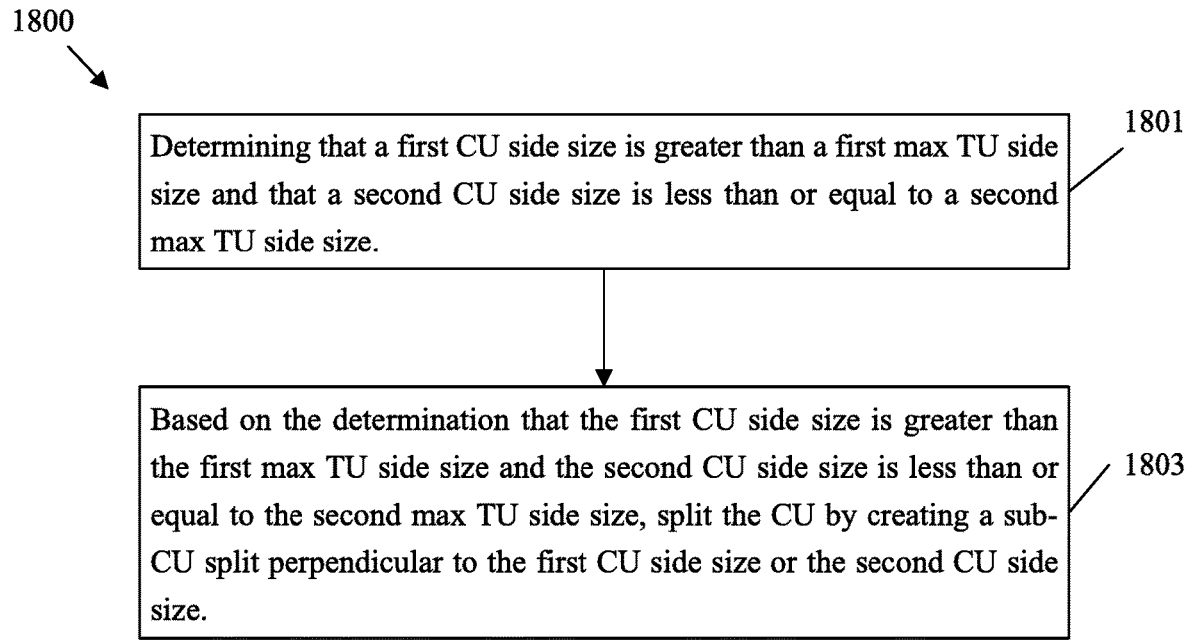
FIG. 18 is a flowchart of an example method of performing a split mechanism.

FIG. 18 is a flowchart of an example method 1800 of performing a split mechanism. Specifically, method 1800 can be employed by step 1603 and/or 1605 of method 1600 and/or step 1705 of method 1700 in order to implement split mechanism 700 and/or 800. Method 1800 can be implemented by an encoder and/or a decoder. Method 1800 is initiated during encoding and/or decoding when a CU size and a max transform size for a corresponding CU is known.

At step 1801, the method 1800 determines that a first CU side size is greater than a first max TU side size, and that a second CU side size is less than or equal to a second max TU side size. In one example, the CU height is greater than the max TU height and the CU width is less than or equal to the max TU width. In another example, the CU width is greater than the max TU width and the CU height is less than or equal to the max TU height.

At step 1803, based on the determination that the first CU side size is greater than the first max TU side size and the second CU side size is less than or equal to the second max TU side size, the CU can be split by creating a sub-CU split perpendicular to the first CU side size. Alternatively, based on the determination that the first CU side size is greater than the first max TU side size and the second CU side size is less than or equal to the second max TU side size, the CU can be split by creating a sub-CU split perpendicular to the second CU side size which results in method 1800 determining not to split the CU.

Figure 19:
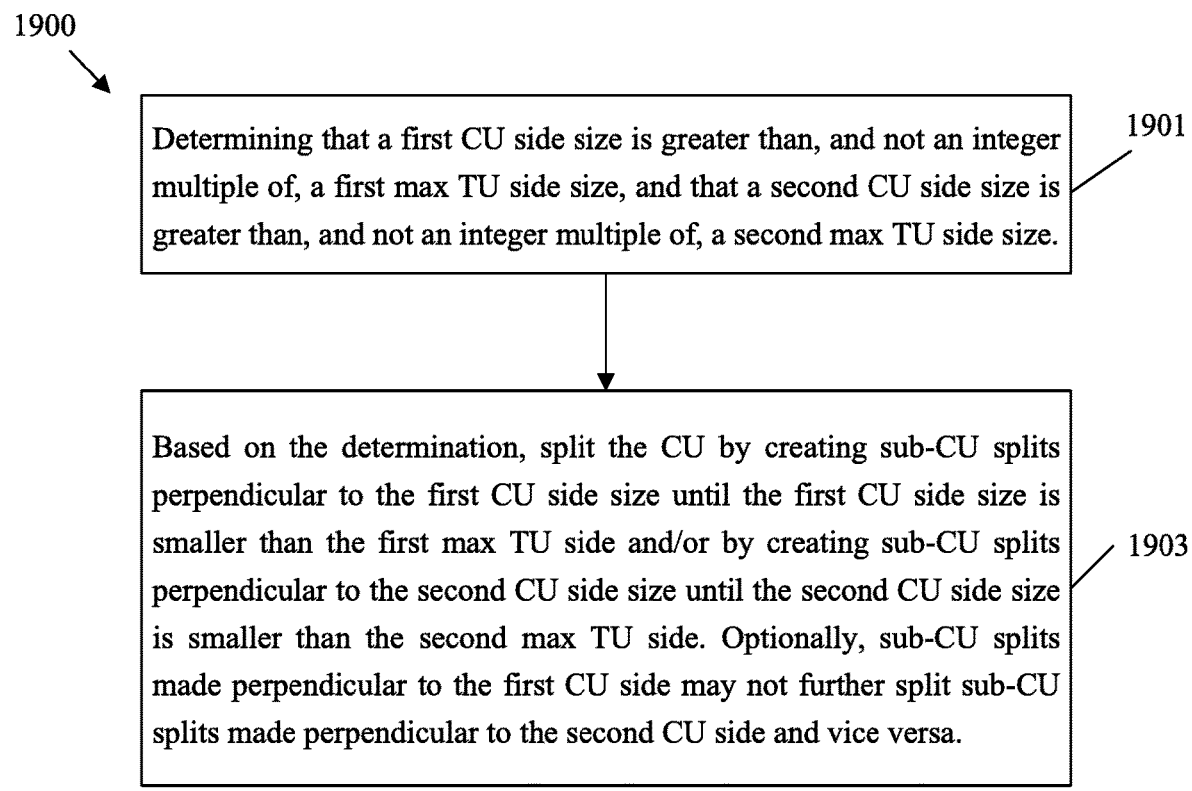
FIG. 19 is a flowchart of another example method of performing a split mechanism.

FIG. 19 is a flowchart of another example method 1900 of performing a split mechanism. Specifically, method 1900 can be employed by step 1603 and/or 1605 of method 1600 and/or step 1705 of method 1700 in order to implement split mechanism 900. Method 1900 can be implemented by an encoder and/or a decoder. Method 1900 is initiated during encoding and/or decoding when a CU size and a max transform size for a corresponding CU is known.

At step 1901, the method 1900 determines that a first CU side size is greater than, and not an integer multiple of, a first max TU side size, and that a second CU side size is greater than, and not an integer multiple of, a second max TU side size. Specifically, both the CU height is greater than the max TU height and the CU width is greater than the max TU width. Further, the width and height of the CU are note integer multiples of the width and height, respectively, of the max TU size.

At step 1903, based on the determination of step 1901, the CU is split by creating sub-CU splits perpendicular to the first CU side size until the first CU side size is smaller than the first max TU side and/or by creating sub-CU splits perpendicular to the second CU side size until the second CU side size is smaller than the second max TU side. Optionally, sub-CU splits made perpendicular to the first CU side may not further split sub-CU splits made perpendicular to the second CU side and vice versa.

Figure 20:
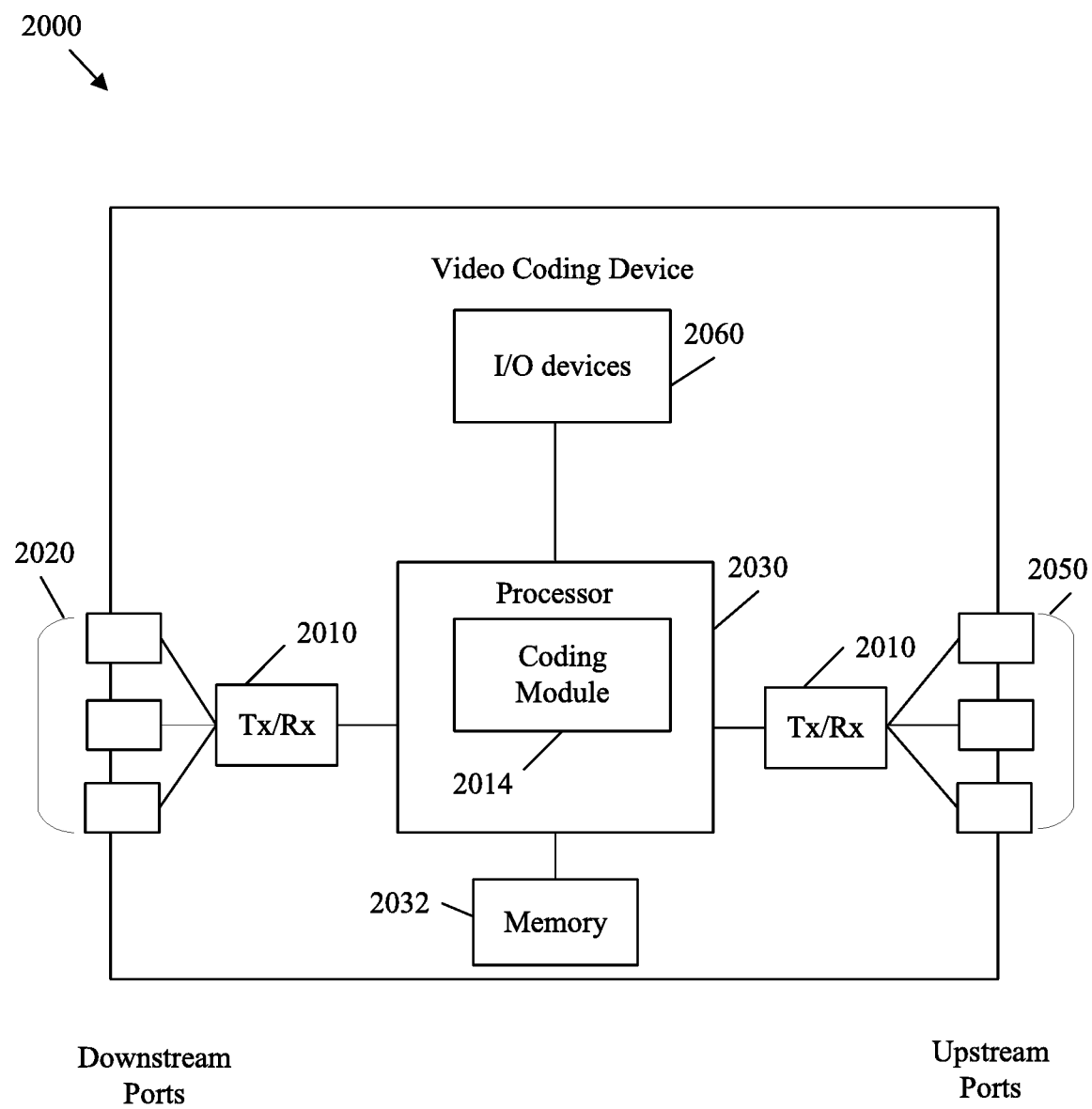
FIG. 20 is a schematic diagram of an example video coding device.

FIG. 20 is a schematic diagram of an example video coding device 2000. The video coding device 2000 is suitable for implementing the disclosed examples/embodiments as described herein. The video coding device 2000 comprises downstream ports 2020, upstream ports 2050, and/or transceiver units (Tx/Rx) 2010, including transmitters and/or receivers for communicating data upstream and/or downstream over a network. The video coding device 2000 also includes a processor 2030 including a logic unit and/or central processing unit (CPU) to process the data and a memory 2032 for storing the data. The video coding device 2000 may also comprise optical-to-electrical (OE) components, electrical-to-optical (EO) components, and/or wireless communication components coupled to the upstream ports 2050 and/or downstream ports 2020 for communication of data via optical or wireless communication networks. The video coding device 2000 may also include input and/or output (I/O) devices 2060 for communicating data to and from a user. The I/O devices 2060 may include output devices such as a display for displaying video data, speakers for outputting audio data, etc. The I/O devices 2060 may also include input devices, such as a keyboard, mouse, trackball, etc., and/or corresponding interfaces for interacting with such output devices.

The processor 2030 is implemented by hardware and software. The processor 2030 may be implemented as one or more CPU chips, cores (e.g., as a multi-core processor), field-programmable gate arrays (FPGAs), application specific integrated circuits (ASICs), and digital signal processors (DSPs). The processor 2030 is in communication with the downstream ports 2020, Tx/Rx 2010, upstream ports 2050, and memory 2032. The processor 2030 comprises a coding module 2014. The coding module 2014 implements the disclosed embodiments described above, such as methods 100, 1600, 1700, 1800, and 1900 and mechanisms 500, 700, 800, 900, 1000, 1100, 1200, 1300, 1400, and/or 1500 in conjunction with intra-prediction modes 600, as well as any other method/mechanism described herein. Further, the coding module 2014 may implement a codec system 200, an encoder 300, and/or a decoder 400. For example, the coding module 2014 can be employed to split a CU into sub-CUs. Specifically, the coding module 2014 may select a split mechanism by comparing CU width and height to max TU width and height, respectively, and then apply a TU to one or more of the sub-CUs. The coding module 2014 may also encode and/or read flags or other syntax to signal the split mechanism that is selected. Further, coding module 2014 can apply TUs to the sub-CUs in an order selected based on the prediction mode selected for the CU. Hence, coding module 2014 causes the video coding device 2000 to operate with greater coding efficiency and/or accuracy. As such, coding module 2014 improves the functionality of the video coding device 2000 as well as addresses problems that are specific to the video coding arts. Further, coding module 2014 effects a transformation of the video coding device 2000 to a different state. Alternatively, the coding module 2014 can be implemented as instructions stored in the memory 2032 and executed by the processor 2030 (e.g., as a computer program product stored on a non-transitory medium).

The memory 2032 comprises one or more memory types such as disks, tape drives, solid-state drives, read only memory (ROM), random access memory (RAM), flash memory, ternary content-addressable memory (TCAM), static random-access memory (SRAM), etc. The memory 2032 may be used as an over-flow data storage device, to store programs when such programs are selected for execution, and to store instructions and data that are read during program execution.

Figure 21:
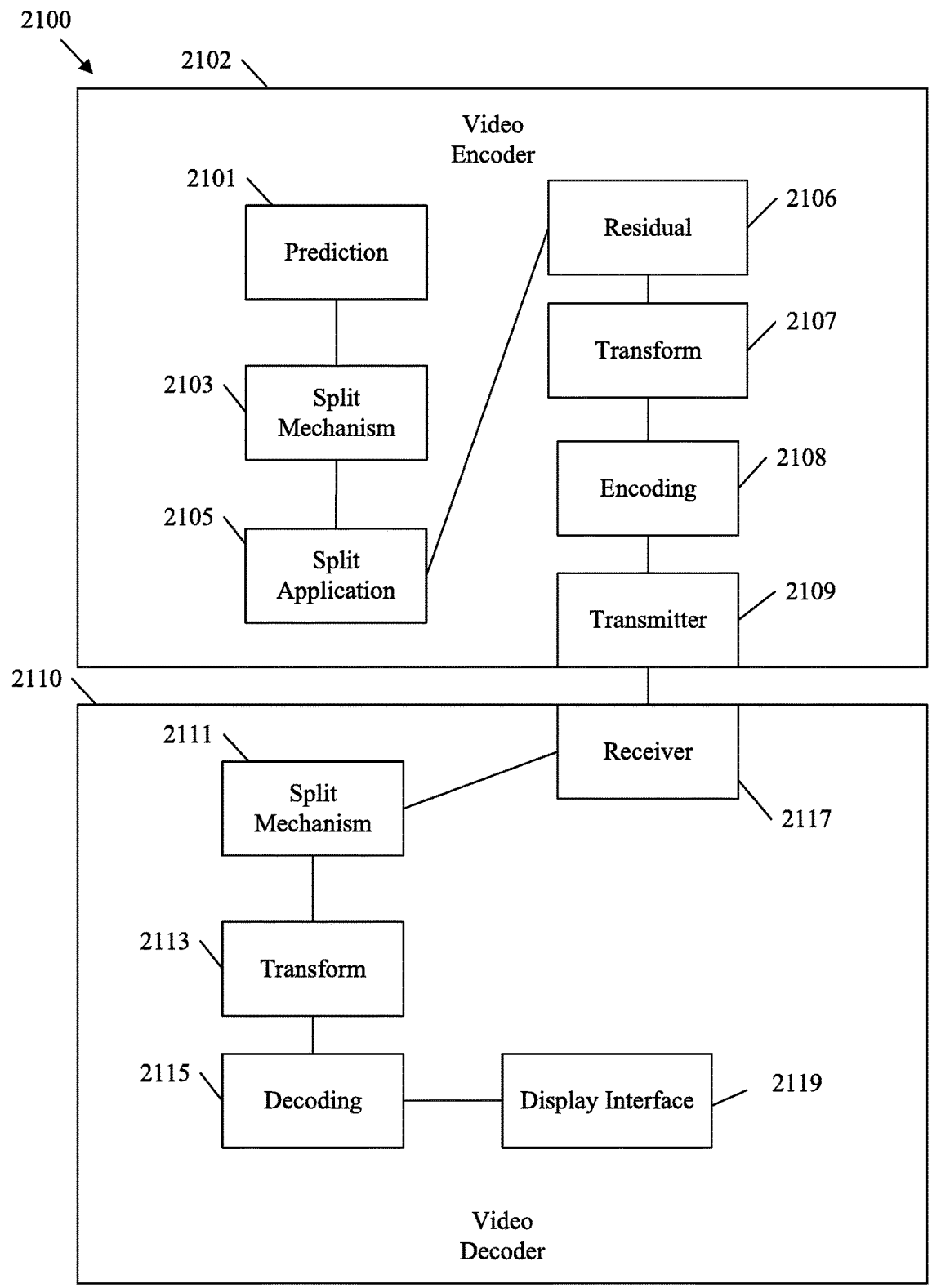
FIG. 21 is a schematic diagram of an example system for selecting a split mechanism for application to a CU by comparing CU dimensions to max TU dimensions.

FIG. 21 is a schematic diagram of an example system 2100 for selecting a split mechanism for application to a CU by comparing CU dimensions to max TU dimensions. The system 2100 includes an encoder 2102 and a decoder 2110, which can be implemented by a codec system 200, an encoder 300, and/or a decoder 400.

The encoder 2102 comprises a prediction module 2101 for selecting an intra-prediction mode to encode a CU. The encoder 2102 further comprises a split mechanism module 2103 selecting a split mechanism to split a CU into sub-CUs for application of one or more transform units (TUs), the selection of the split mechanism based on comparing a CU width to a max TU width and comparing a CU height to a max TU height. The encoder 2102 further comprises a split application module 2105 for applying the selected split mechanism to the CU to obtain sub-CUs. The encoder 2102 further comprises a residual module 2106 for determining a residual of one of the sub-CUs, the residual including a difference between sample values for the sub-CU and prediction samples for the sub-CU. The encoder 2102 further comprises a transform module 2107 applying the TUs to transform the residual of the CU based on results of the selected split mechanism. The encoder 2102 further comprises an encoding module 2108 for encoding a transformed residual for the CU into a bitstream. The encoder 2102 further comprises a transmitting module 2109 for transmitting the bitstream toward a decoder to support reconstructing the CU for display.

The decoder 2110 comprises a receiving module 2117 for receiving the bitstream, the bitstream including a transformed residual of a CU, the transformed residual including a difference between sample values for the CU and prediction samples for the CU as being transformed by a transform. The decoder 2110 further comprises a split mechanism module 2111 for selecting a split mechanism to split the CU into sub-CUs for application of one or more inverse TUs to the transformed residual, the split mechanism selected by comparing a CU width to a max TU width and comparing a CU height to a max TU height. The decoder 2110 further comprises a transform module 2113 for applying the inverse TUs on the sub-CUs of the CU to decompress the transformed residual into a residual of the CU based on results of the selected split mechanism. The decoder 2110 also comprises a decoding module 2115 reconstructing sample values for the CU based on the residual and the prediction samples. The decoder 2110 also comprises a display interface module 2119 for forwarding the reconstructed sample values for the CU toward a display a part of a reconstructed video.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented in an encoder, the method comprising:
    selecting, by a processor, a split mechanism to split a coding unit (CU) into sub-CUs for application of one or more transform units (TUs), wherein the split mechanism is selected by comparing a CU width to a max TU width and comparing a CU height to a max TU height, and wherein the split mechanism is configured to create sub-CUs sized based on the max TU width and the max TU height;
    applying, by the processor, the split mechanism to the CU to obtain sub-CUs;
    selecting an intra-prediction mode to encode each sub-CU of the CU;
    determining, by the processor, a residual of one of the sub-CUs, the residual including a difference between sample values for the sub-CU and prediction samples for the sub-CU;
    applying the TUs to transform the residual of the CU based on results of the split mechanism, wherein applying the TUs to transform the residual of the sub-CUs of the CU based on results of the split mechanism includes applying the TUs in an order based on the intra-prediction mode, wherein the intra-prediction mode points in a direction, and wherein applying the TUs in an order based on the intra-prediction mode includes:
        first applying a first TU on a sub-CU positioned opposite of the direction pointed to by the intra-prediction mode, and
        applying a last TU on a sub-CU positioned in the direction pointed to by the intra-prediction mode last; and
    encoding, by the processor, a transformed residual for the CU into a bitstream.

2. The method of claim 1, wherein the split mechanism includes:
    determining that a CU width is greater than a max TU width, and that a CU height is less than or equal to a max TU height, and
    determine not to split the CU when a height of a TU is not smaller than the max TU height and a width of a TU is not smaller than the max TU width.

3. The method of claim 1, wherein the split mechanism includes:
    determining that a CU width is greater than a max TU width, and that a CU height is less than or equal to a max TU height, and
    based on the determination that the CU width is greater than the max TU width and the CU height is less than or equal to the max TU height, splitting the CU by creating a sub-CU split perpendicular to the CU width.

4. A method implemented in an encoder, the method comprising:
    selecting, by a processor, a split mechanism to split a coding unit (CU) into sub-CUs for application of one or more transform units (TUs), wherein the split mechanism is selected by comparing a CU width to a max TU width and comparing a CU height to a max TU height, and wherein the split mechanism is configured to create sub-CUs sized based on the max TU width and the max TU height;

applying, by the processor, the split mechanism to the CU to obtain sub-CUs, wherein the split mechanism includes:
  determining that a CU width is greater than, and not an integer multiple of, a max TU width, and that a CU height is greater than, and not an integer multiple of, a max TU height, and
  based on the determination that the CU width is greater than, and not an integer multiple of, the max TU width, and that the CU height is greater than, and not an integer multiple of, the max TU height, splitting the CU by creating sub-CU splits perpendicular to the CU width until the CU width is smaller than a first max TU side size or by creating sub-CU splits perpendicular to the CU height until the CU height is smaller than the max TU height;
determining, by the processor, a residual of one of the sub-CUs, the residual including a difference between sample values for the sub-CU and prediction samples for the sub-CU;
applying the TUs to transform the residual of the CU based on results of the split mechanism; and
encoding, by the processor, a transformed residual for the CU into a bitstream.

5. The method of claim 4, wherein sub-CU splits made perpendicular to the CU width do not further split sub-CU splits made perpendicular to the CU height and vice versa.

6. The method of claim 4, further comprising encoding a flag in the bitstream to indicate the split mechanism selected for the CU.

7. A method implemented in a decoder, the method comprising:
  receiving, by a receiver, a bitstream, the bitstream including encoded content corresponding to a transformed residual of a coding unit (CU), the transformed residual including a difference between sample values for the CU and prediction samples for the CU as being transformed by a transform;
  selecting, by a processor, a split mechanism to split the CU into sub-CUs for application of one or more inverse transform units (TUs) to the transformed residual, wherein the split mechanism is selected by comparing a CU width to a max TU width and comparing a CU height to a max TU height, and wherein the split mechanism is configured to create sub-CUs sized based on the max TU width and the max TU height, wherein selection of the split mechanism comprises:
    determining that a CU width is greater than, and not an integer multiple of, a max TU width, and that a CU height is greater than, and not an integer multiple of, a max TU height, and
    based on the determination that the CU width is greater than, and not an integer multiple of, the max TU width, and that the CU height is greater than, and not an integer multiple of, the max TU height, splitting the CU by creating sub-CU splits perpendicular to the CU width until the CU width is smaller than the max TU width or by creating sub-CU splits perpendicular to the CU height until the CU height is smaller than the max TU height;
  applying, by the processor, the split mechanism to the CU to obtain the sub-CUs and applying the inverse TUs on the sub-CUs to inversely transform the transformed residual into a residual of the CU; and
  reconstructing, by the processor, sample values for the CU based on the residual and the prediction samples.

8. The method of claim 7, wherein sub-CU splits made perpendicular to the CU width do not further split sub-CU splits made perpendicular to the CU height and vice versa.

9. The method of claim 7, wherein the bitstream includes an intra-prediction mode for sub-CUs of the CU, and wherein applying the inverse TUs to decompress the transformed residual into a residual of the CU based on results of the split mechanism includes applying the inverse TUs in an order based on the intra-prediction mode.

10. A method implemented in a decoder, the method comprising:
  receiving, by a receiver, a bitstream, the bitstream including encoded content corresponding to a transformed residual of a coding unit (CU), the transformed residual including a difference between sample values for the CU and prediction samples for the CU as being transformed by a transform;
  selecting, by a processor, a split mechanism to split the CU into sub-CUs for application of one or more inverse transform units (TUs) to the transformed residual, the split mechanism selected by comparing a CU width to a max TU width and comparing a CU height to a max TU height;
  applying, by the processor, the split mechanism to the CU to obtain the sub-CUs and applying the inverse TUs on the sub-CUs to inversely transform the transformed residual into a residual of the CU; and
  reconstructing, by the processor, sample values for the CU based on the residual and the prediction samples,
  wherein the bitstream includes an intra-prediction mode for sub-CUs of the CU, wherein applying the inverse TUs to decompress the transformed residual into a residual of the CU based on results of the split mechanism includes applying the inverse TUs in an order based on the intra-prediction mode, wherein the intra-prediction mode points in a direction, and wherein applying the inverse TUs in an order based on the intra-prediction mode includes:
    first applying a first inverse TU on a sub-CU positioned opposite of the direction pointed to by the intra-prediction mode, and
    applying a last inverse TU on a sub-CU positioned in the direction pointed to by the intra-prediction mode last.

11. The method of claim 10, wherein selection of the split mechanism comprises:
  determining that a CU width is greater than a max TU width, and that a CU height is less than or equal to a max TU height, and
  based on the determination that the CU width is greater than the max TU width and the CU height is less than or equal to the max TU height, determine not to split the CU.

12. The method of claim 10, wherein selection of the split mechanism comprises:
  determining that a CU width is greater than a max TU width, and that a CU height is less than or equal to a max TU height, and
  based on the determination that the CU width is greater than the max TU width and the CU height is less than or equal to the max TU height, splitting the CU by creating a sub-CU split perpendicular to the CU width.

13. The method of claim 10, wherein selection of the split mechanism comprises:
  determining that a CU width is greater than a max TU width, and that a CU height is less than or equal to a max TU height; and in response to the determination, the method further comprising receiving, by the receiver, a flag in the bitstream indicating the split mechanism selected for the CU, and the split mechanism is either not to split the CU or splitting the CU by creating a sub-CU split perpendicular to the CU width.

14. A method implemented in a decoder, the method comprising:

receiving, by a receiver, a bitstream, the bitstream including encoded content corresponding to a transformed residual of a coding unit (CU), the transformed residual including a difference between sample values for the CU and prediction samples for the CU as being transformed by a transform;

selecting, by a processor, a split mechanism to split the CU into sub-CUs for application of one or more inverse transform units (TUs) to the transformed residual, wherein the split mechanism is selected by comparing a CU width to a max TU width and comparing a CU height to a max TU height, and wherein the split mechanism is configured to create sub-CUs sized based on the max TU width and the max TU height, wherein selection of the split mechanism comprises:

determining that a CU width is greater than, and not an integer multiple of, a max TU width, and that a CU height is greater than, and not an integer multiple of, a max TU height; and in response to the determination, the method further comprising receiving, by the receiver, a flag in the bitstream indicating the split mechanism selected for the CU, and the split mechanism is either splitting the CU by creating sub-CU splits perpendicular to the CU width until the CU width is smaller than the max TU width or splitting the CU by creating sub-CU splits perpendicular to the CU height until the CU height is smaller than the max TU height;

applying, by the processor, the split mechanism to the CU to obtain the sub-CUs and applying the inverse TUs on the sub-CUs to inversely transform the transformed residual into a residual of the CU; and reconstructing, by the processor, sample values for the CU based on the residual and the prediction samples.

* * * * *